US007609159B2

(12) United States Patent
Benson et al.

(10) Patent No.: US 7,609,159 B2
(45) Date of Patent: Oct. 27, 2009

(54) TRUSTED MONITORING SYSTEM AND METHOD

(75) Inventors: Greg Benson, Rancho Santa Fe, CA (US); Matthew Anthony Fistonich, San Diego, CA (US)

(73) Assignee: Palomar Technology, LLC, Del Mar, CA (US)

( * ) Notice: Subject to any disclaimer, the term of this patent is extended or adjusted under 35 U.S.C. 154(b) by 0 days.

(21) Appl. No.: 11/418,381

(22) Filed: May 3, 2006

(65) Prior Publication Data

US 2007/0002139 A1 Jan. 4, 2007

Related U.S. Application Data

(60) Provisional application No. 60/677,164, filed on May 3, 2005, provisional application No. 60/735,539, filed on Nov. 10, 2005.

(51) Int. Cl.
*G08B 21/00* (2006.01)

(52) U.S. Cl. ............. 340/540; 340/539.13; 340/539.26; 340/568.1

(58) Field of Classification Search ................. 340/540, 340/539.13, 539.26, 521, 539.14, 539.1, 340/508, 573.1, 568.1; 705/22
See application file for complete search history.

(56) References Cited

U.S. PATENT DOCUMENTS 4,636,634 A 1/1987 Harper
5,068,798 A 11/1991 Heath et al.
5,078,952 A 1/1992 Gozani
5,199,672 A 4/1993 King et al.
5,219,194 A 6/1993 Trent
5,280,527 A 1/1994 Gullman et al.

(Continued)

FOREIGN PATENT DOCUMENTS

WO WO 00/65770 A 11/2000

(Continued)

OTHER PUBLICATIONS

International Search Report for International application No. PCT/US2006/0017100 dated Feb. 13, 2007.

(Continued)

*Primary Examiner*—Anh V La
(74) *Attorney, Agent, or Firm*—Knobbe Martens Olson & Bear LLP

(57) ABSTRACT

Methods and apparatus for monitoring remotely located objects with a system comprised of at least one master data collection unit, any number of remote sensor units, and a central data collection server are described. The master unit is configured to monitor any object, mobile or stationary, including monitoring multiple remote sensor units associated with the objects being monitored. The master unit may be in a fixed location, or attached to a mobile object. The master unit is configured for monitoring objects that enter and leave the area where it is located. The master unit may act as a parent controller for one or more child devices, wherein the child devices can be remote sensors or monitors of various measurable conditions including environmental conditions, substance identification, product identification and biometric identification. The master unit is able to discover new remote sensor units as they enter or leave the area where the master unit is located. The master unit can be remotely reprogrammed. The reprogramming can be accomplished with authenticated instructions.

19 Claims, 14 Drawing Sheets

| Channel | Antenna A | Antenna n |
|---|---|---|
| Peer to Peer | 1 | 1[a] |
| GPS | 2 | 2[a] |
| Satellite | 3 | 3[a] |
| Cell Netw. | 4 | 4[a] |
| Regional | 5 | 5[a] |
| Intermediary | 6 | 6[a] |

U.S. PATENT DOCUMENTS

| | | | | |
|---|---|---|---|---|
| 5,345,809 | A | 9/1994 | Corrigan | |
| 5,377,906 | A | 1/1995 | Mason | |
| 5,416,706 | A | 5/1995 | Hagenbuch | |
| 5,528,228 | A | 6/1996 | Wilk | |
| 5,629,498 | A | 5/1997 | Pollock | |
| 5,644,489 | A | 7/1997 | Hagenbuch | |
| 5,696,884 | A | 12/1997 | Heckerman et al. | |
| 5,774,876 | A | 6/1998 | Woolley | |
| 5,905,443 | A | 5/1999 | Olds et al. | |
| 5,917,433 | A | 6/1999 | Keillor et al. | |
| 5,963,131 | A * | 10/1999 | D'Angelo et al. | 340/568.1 |
| 6,070,143 | A | 5/2000 | Barney et al. | |
| 6,204,764 | B1 | 3/2001 | Maloney | |
| 6,248,063 | B1 | 6/2001 | Barnhill et al. | |
| 6,281,797 | B1 | 8/2001 | Forster | |
| 6,370,222 | B1 | 4/2002 | Cornick | |
| 6,398,727 | B1 | 6/2002 | Bui et al. | |
| 6,448,898 | B1 | 9/2002 | Kasik | |
| 6,483,434 | B1 | 11/2002 | Umiker | |
| 6,560,592 | B1 | 5/2003 | Reid et al. | |
| 6,594,578 | B2 | 7/2003 | Lai | |
| 6,613,571 | B2 | 9/2003 | Cordery | |
| 6,669,631 | B2 | 12/2003 | Norris et al. | |
| 6,707,381 | B1 | 3/2004 | Maloney | |
| 6,763,299 | B2 | 7/2004 | Jones | |
| 6,765,490 | B2 | 7/2004 | Lopez et al. | |
| 6,768,421 | B1 | 7/2004 | Alioto | |
| 6,782,302 | B1 | 8/2004 | Barto et al. | |
| 6,801,819 | B1 | 10/2004 | Barto et al. | |
| 6,919,803 | B2 * | 7/2005 | Breed | 340/539.14 |
| 6,988,279 | B1 | 1/2006 | Kanevsky | |
| 7,032,816 | B2 | 4/2006 | Markham et al. | |
| 7,046,138 | B2 * | 5/2006 | Webb, Sr. | 340/539.13 |
| 7,126,473 | B1 | 10/2006 | Powell | |
| 7,218,974 | B2 | 5/2007 | Rumi et al. | |
| 7,225,031 | B2 | 5/2007 | Feliss et al. | |
| 7,334,130 | B2 | 2/2008 | Bowers | |
| 7,353,532 | B2 | 4/2008 | Duri et al. | |
| 2002/0017977 | A1 * | 2/2002 | Wall | 340/5.28 |
| 2002/0017989 | A1 * | 2/2002 | Forster et al. | 340/540 |
| 2002/0083022 | A1 | 6/2002 | Algazi | |
| 2002/0083067 | A1 | 6/2002 | Tamayo et al. | |
| 2002/0120864 | A1 | 8/2002 | Wu et al. | |
| 2002/0124664 | A1 | 9/2002 | Call | |
| 2002/0138017 | A1 | 9/2002 | Bui et al. | |
| 2002/0152185 | A1 | 10/2002 | Satish | |
| 2003/0056113 | A1 | 3/2003 | Korosec | |
| 2003/0227392 | A1 | 12/2003 | Ebert | |
| 2004/0006398 | A1 | 1/2004 | Bickford | |
| 2004/0026491 | A1 | 2/2004 | Beckert | |
| 2004/0041706 | A1 | 3/2004 | Stratmoen et al. | |
| 2004/0066887 | A1 | 4/2004 | Garfinkle | |
| 2004/0122703 | A1 | 6/2004 | Walker et al. | |
| 2004/0122709 | A1 | 6/2004 | Avinash et al. | |
| 2004/0174259 | A1 | 9/2004 | Peel et al. | |
| 2004/0196182 | A1 | 10/2004 | Unnold | |
| 2004/0233055 | A1 | 11/2004 | Canich | |
| 2004/0257223 | A1 | 12/2004 | Webb et al. | |
| 2004/0260666 | A1 | 12/2004 | Pestotnik et al. | |
| 2005/0261934 | A1 | 11/2005 | Thompson | |
| 2006/0080316 | A1 | 4/2006 | Gilmore et al. | |
| 2006/0291657 | A1 | 12/2006 | Benson et al. | |
| 2007/0008410 | A1 * | 1/2007 | Benson et al. | 348/143 |
| 2007/0011107 | A1 | 1/2007 | Benson et al. | |
| 2007/0011108 | A1 | 1/2007 | Benson et al. | |
| 2007/0022057 | A1 | 1/2007 | Benson et al. | |
| 2007/0030143 | A1 | 2/2007 | Benson et al. | |
| 2007/0164857 | A1 | 7/2007 | Odenwald et al. | |
| 2007/0182544 | A1 | 8/2007 | Benson et al. | |

FOREIGN PATENT DOCUMENTS

| | | | |
|---|---|---|---|
| WO | WO 01/27794 | A2 | 4/2001 |
| WO | WO 01/63994 | A | 8/2001 |

OTHER PUBLICATIONS

International Preliminary Report on Patentability for PCT Application No. US2006/016895, dated Nov. 15, 2007, 11 pages.

International Preliminary Report on Patentability for PCT Application No. US2006/017100, dated Nov. 15, 2007, 8 pages.

"Neural Networks" Electronic Textbook Statsoft. 1998 p. 1-31.

* cited by examiner

| Channel | Antenna A | Antenna n |
|---|---|---|
| Peer to Peer | 1 | 1a |
| GPS | 2 | 2a |
| Satellite | 3 | 3a |
| Cell Netw. | 4 | 4a |
| Regional | 5 | 5a |
| Intermediary | 6 | 6a |

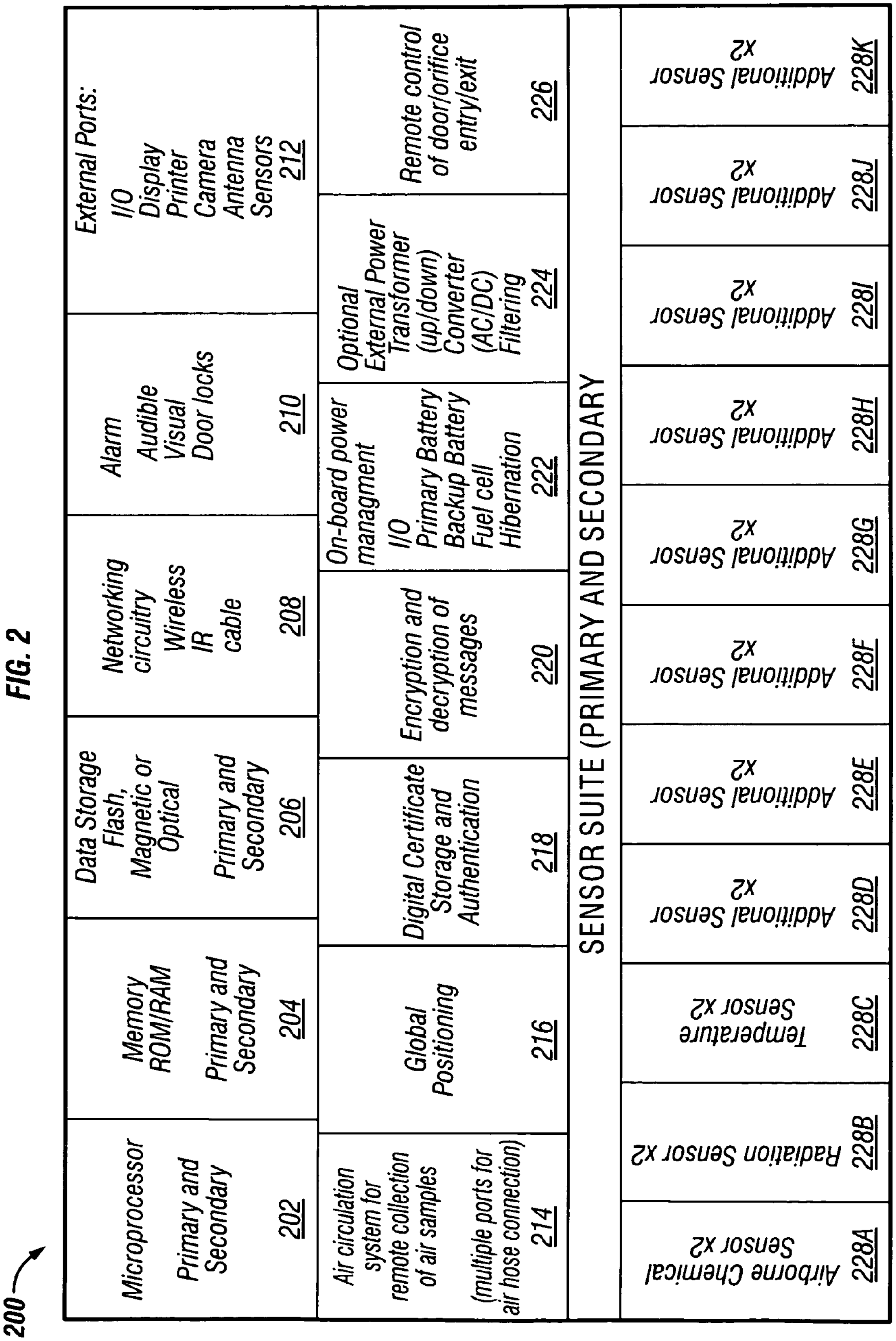

FIG. 2

| Microprocessor<br>Primary and Secondary<br>202 | Memory<br>ROM/RAM<br>Primary and Secondary<br>204 | Data Storage<br>Flash, Magnetic or Optical<br>Primary and Secondary<br>206 | Networking circuitry<br>Wireless<br>IR<br>cable<br>208 | Alarm<br>Audible<br>Visual<br>Door locks<br>210 | External Ports:<br>I/O<br>Display<br>Printer<br>Camera<br>Antenna<br>Sensors<br>212 |
|---|---|---|---|---|---|
| Air circulation system for remote collection of air samples<br>(multiple ports for air hose connection)<br>214 | Global Positioning<br>216 | Digital Certificate Storage and Authentication<br>218 | Encry

| Slave Microprocessor 302 | Memory ROM/RAM Primary and Secondary 304 | Data Storage Flash, Magnetic or Optical Primary and Secondary 306 | Networking circuitry Wireless IR cable 308 | External Ports: I/O Display Printer Camera Antenna Sensors 312 |
|---|---|---|---|---|
| Air circulation system for remote collection of air samples (multiple ports for air hose connection) 314 | One or more sensor module 316 | Digital Certificate Storage and Authentication 318 | Encryption and decryption of messages 320 | On-board power managment I/O Primary Battery Backup Battery Fuel cell Hibernation 322 | Optional External Power Transformer (up/down) Converter (AC/DC) Filtering 324 |

300

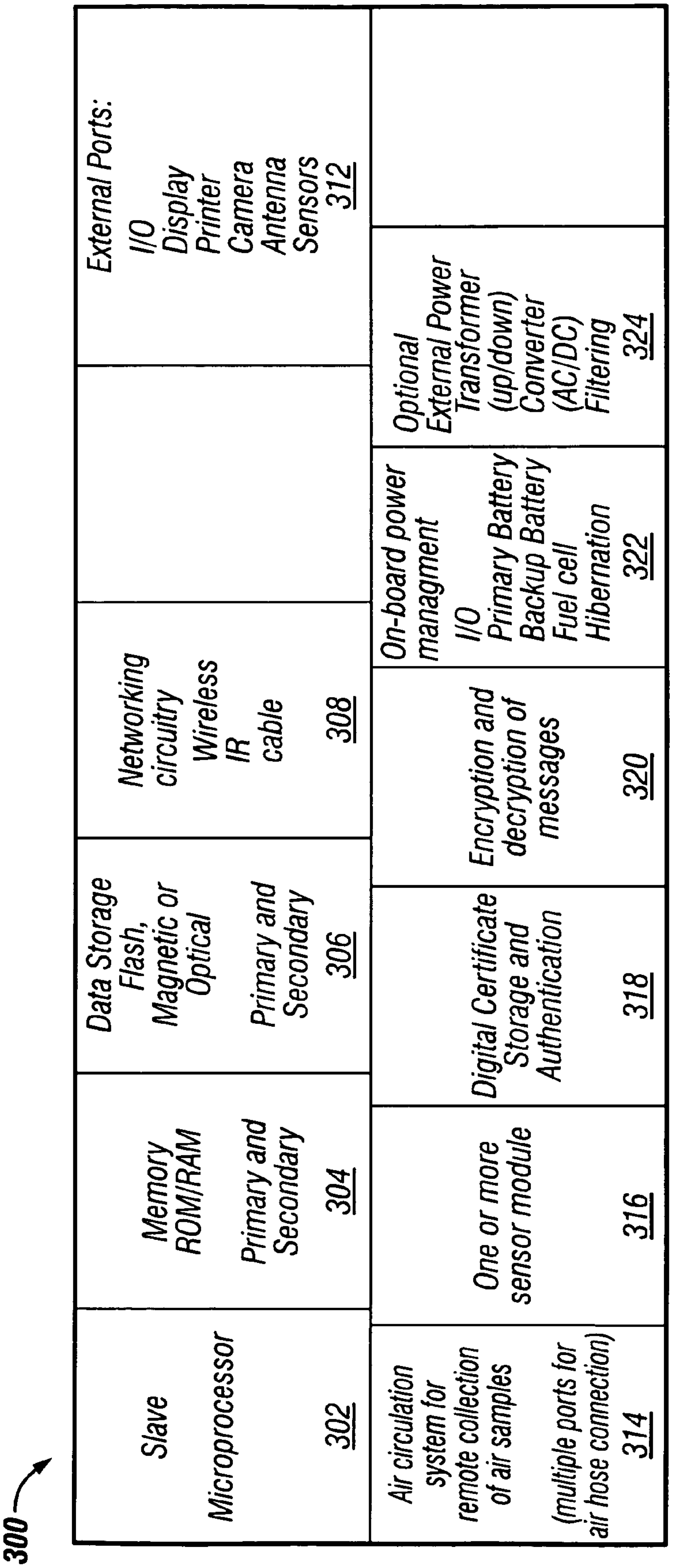

FIG. 3

| HEADER | | | | | | | | | | |
|---|---|---|---|---|---|---|---|---|---|---|
| Field | Description | Data | Version | Checksum | | | | | | |
| 1 | Digital signature | s7jf54kdh3 | 2.4 | 398735 | | | | | | |
| 2 | Customer ID | 12345 | | | | | | | | |
| 3 | Project ID | 8765 | | | | | | | | |
| 4 | Master Unit ID | 2098999 | | | | | | | | |
| 5 | Vessle / Structure ID | 999764 | | | | | | | | |
| 6 | Location ID | 2 | | | | | | | | |
| 7 | Logistics bill number | 1001 | | | | | | | | |
| 8 | Service Start/Stop | 0:00:12 | | | | | | | | |
| 9 | Replace previous script | | | | | | | | | |
| 10 | Script version nr. | | | | | | | | | |
| | | | | | | | | | | |
| BODY | | | | | | | | | | |
| Field | Service Description | Activate Sensor A | Activate Sensor B | Compare A to B | Sample Interval (seconds) | Transmit Interval (minutes) | Date and Timestamp | Log Data Locally | Encrypt | Authenticate |
| 1 | Temperature | Y | Y | Y | 5 | 30 | Y | Y | Y | Y |
| 2 | GPS location | Y | Y | Y | 5 | 30 | Y | Y | Y | Y |
| 3 | Atmospheric/barometric | Y | Y | Y | 5 | 30 | Y | Y | Y | Y |
| 4 | Radiation | Y | Y | Y | 60 | 360 | Y | Y | Y | Y |
| 5 | Chemical | Y | Y | Y | 60 | 360 | Y | Y | Y | Y |
| 6 | Image collection | Y | Y | Y | 120 | 720 | Y | Y | Y | Y |
| 7 | Sound collection | Y | Y | Y | 120 | 720 | Y | Y | Y | Y |
| 8 | RFID or nano-sensor | Y | Y | Y | 120 | 360 | Y | Y | Y | Y |
| 9 | On device tampering | Y | Y | Y | | | Y | Y | Y | Y |
| 10 | Check for signal jam | Y | Y | Y | | | Y | Y | Y | Y |
| 11 | QueryCOM channels | Y | Y | Y | | | Y | Y | Y | Y |
| 12 | Transmit data to base | Y | Y | Y | | | Y | Y | Y | Y |
| 13 | Sound Audible alarm | Y | Y | Y | | | Y | Y | Y | Y |
| 14 | Activate door locks | Y | Y | Y | | | Y | Y | Y | Y |

*FIG. 8*

TRUSTED MONITORING SYSTEM AND METHOD

CROSS-REFERENCE TO RELATED APPLICATIONS

This application claims priority of U.S. provisional application Ser. No. 60/677,164 filed on May 3, 2005, and of U.S. provisional application Ser. No. 60/735,539 filed on Nov. 10, 2005, both of which are incorporated by reference in their entirety. This application is one of a set of related U.S. applications, the set including: TRUSTED MONITORING SYSTEM AND METHOD (Ser. No 11/418,385, filed on even date herewith); TRUSTED MONITORING SYSTEM AND METHOD (Ser. No. 11/418,381, filed on even date herewith); TRUSTED MONITORING SYSTEM AND METHOD (Ser. No. 11/418,380, filed on even date herewith); TRUSTED MONITORING SYSTEM AND METHOD (Ser. No. 11418,472, filed on even date herewith); TRUSTED MONITORING SYSTEM AND METHOD (Ser. No. 11/417,910, filed on even date herewith) TRUSTED MONITORING SYSTEM AND METHOD (Ser. No. 11/418,496, filed on even date herewith); TRUSTED DECISION SUPPORT SYSTEM AND METHOD (Ser. No. 11/417,887, filed on even date herewith); TRUSTED DECISION SUPPORT SYSTEM AND METHOD (Ser. No. 11/418,448, filed on even date herewith); TRUSTED DECISION SUPPORT SYSTEM AND METHOD (Ser. No. 11/418,382, filed on even date herewith); TRUSTED DECISION SUPPORT SYSTEM AND METHOD (Ser. No. 11/418,395, filed on even date herewith); TRUSTED DECISION SUPPORT SYSTEM AND METHOD (Ser. No. 11/418,447, filed on even date herewith); TRUSTED DECISION SUPPORT SYSTEM AND METHOD (Ser. No. 11/417,893, filed on even date herewith); all of which are incorporated by reference in their entirety.

BACKGROUND OF THE INVENTION

1. Field of the Invention

The field of the invention relates to wireless surveillance and tracking. More particularly, the invention relates to monitoring the state of potentially hostile environments and threat assessment.

2. Description of the Related Art

In the aftermath of Sep. 11, 2001 (9/11), studies have focused on what could have been done before, during and after; either to have prevented it from happening or reduced the destruction and casualties. Two fundamental weaknesses have been identified: 1) the failure to gather, process and disseminate early indicators in an efficient manner, and 2) the lack of a common, interoperable communications platform for distributing all forms of information. Furthermore, the 9/11 attack pointed out the fact that virtually every building, vehicle, public venue and person, regardless of where it is in the world, is potentially vulnerable as a future target. Thus, there is a need for improved systems and methods for controlling security risks.

SUMMARY OF THE INVENTION

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Inventive Embodiments" one will understand how the features of this invention provide advantages over other error management solutions.

An embodiment of this invention provides a trusted and highly reliable self-contained computer-controlled sensing device that can be configured to monitor any object with a variable number of sensors. Some aspects provide tempest construction and remote re-programmability. Thus some embodiments may be deployed for virtually any application from home security to aircraft security.

One embodiment is a surveillance system including a plurality of sensors configured to sample environmental and spatial conditions, and an electronic device configured to receive data from the sensors. The electronic device is further configured to monitor the received data for anomalies by comparing the received data to a range of acceptable values, and the electronic device includes a motion sensor configured to detect unauthorized contact with the electronic device.

Another embodiment is a system including a sensor configured to sample environmental and spatial conditions, where the sensor includes a motion sensor. The system also includes an electronic device configured to receive data from the sensor and to determine integrity of the received data. The electronic device is further configured to monitor data received from the motion sensor to detect unauthorized contact with the sensor.

Another embodiment is a surveillance system including a plurality of sensors configured to sample environmental and spatial conditions, and an electronic device configured to receive data from the sensors. The electronic device is further configured to monitor the received data, and the electronic device includes a motion sensor. The electronic device is further configured to transmit an alarm condition to a remote device if the motion sensor data indicates that the electronic device moves outside of a pre-defined area.

Another embodiment is a monitoring system including at least one sensing device including a plurality of sensors including a motion sensor, and an electronic device configured to receive data from the sensing device. The electronic device is further configured to monitor the received data and to determine integrity of the received data. The electronic device further is configured to monitor data received from the motion sensor to detect movement of the sensing device, and the electronic device is further configured to transmit an alarm condition to a remote device if the motion sensor data indicates that the sensing device moves outside of a predefined area.

Another embodiment is a system including a plurality of sensors, and an electronic device configured to receive data from the sensors, where the electronic device is configured to transmit sensor data in a secure manner to a remote server, and where the electronic device includes a sensor for detecting jamming.

BRIEF DESCRIPTION OF THE DRAWINGS

FIG. 2 is a functional block diagram of certain components of a master unit.

FIG. 3 is a functional block diagram of certain components of a remote sensor unit.

FIG. 8 is a master unit task assignment script for communicating task assignments to a master unit.

DETAILED DESCRIPTION OF CERTAIN INVENTIVE EMBODIMENTS

Figure 1A:
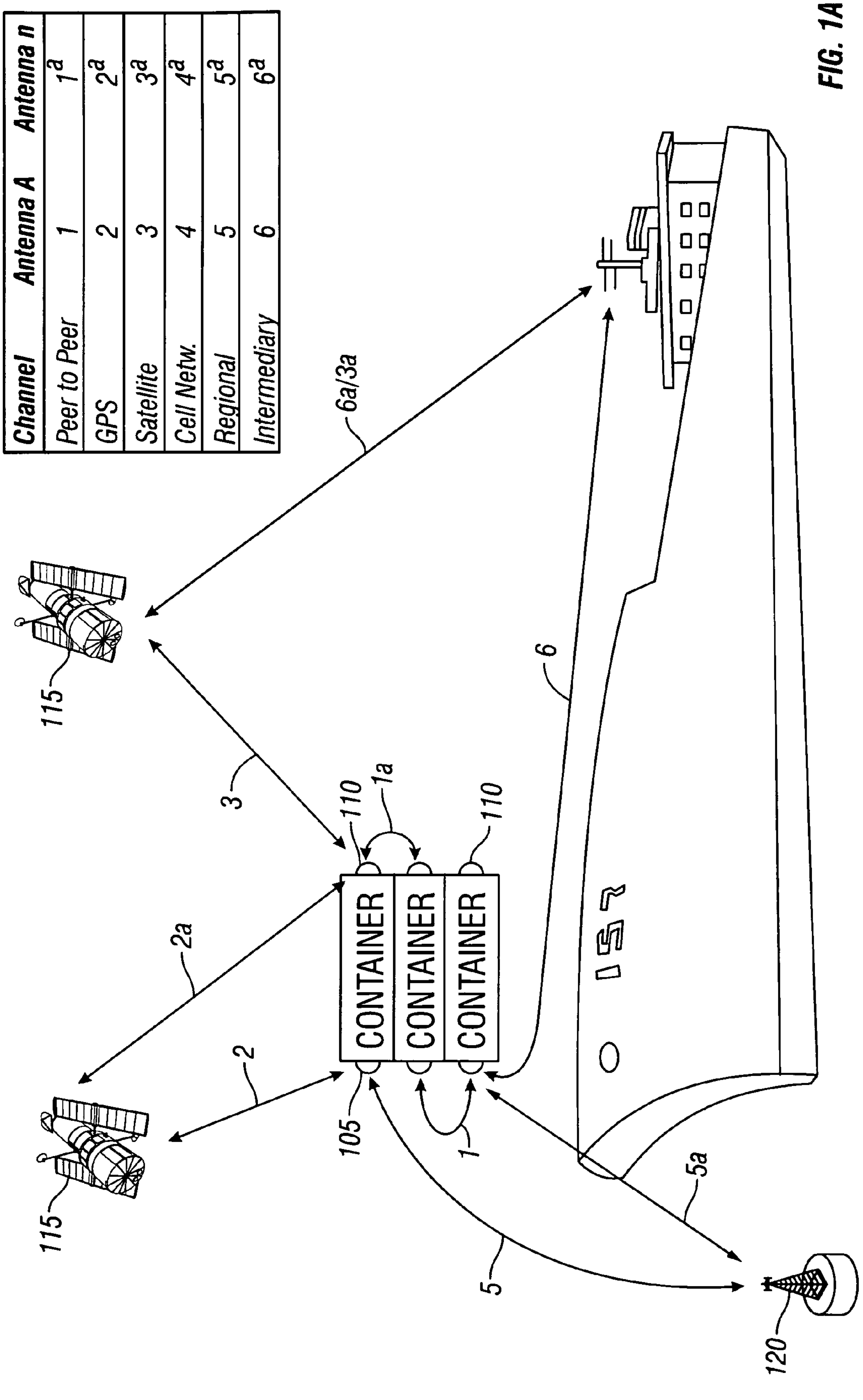
FIG. 1A illustrates an example of a communication system for providing redundant communications between one or more master units and one or more remote sensor units.

Methods and apparatus for monitoring remotely located objects with a system comprised of at least one master data collection unit, any number of remote sensor units, and a central data collection server are described. The master unit can be configured to monitor any object, mobile or stationary, including monitoring multiple remote sensor units associated with the objects being monitored. The master unit may be in a fixed location, or attached to a mobile object. The master unit can be configured for monitoring objects that enter and leave the area where it is located. The master unit may act as a parent controller for one or more child devices, wherein the child devices can be remote sensors or monitors of various measurable conditions including environmental conditions, substance identification, product identification and biometric identification. The master unit may be able to discover new remote sensor units as they enter or leave the area where the master unit is located. The master unit may be able to be remotely reprogrammed. The reprogramming may be accomplished with authenticated instructions.

The remote sensor units are configured to communicate with the master unit. The communication can be over a secure communication link. Remote sensors can be commanded to provide monitored information to the master unit on an as needed basis, on a fixed time basis or in other ways. Remote sensor units may be connected to various peripheral measuring devices.

The central data collection server is connected to the master unit via one or more communication links. The central data collection server can send instructions to the master unit over the one or more communication links. The instructions can include monitoring task instructions, reprogramming instructions, diagnostic test instructions and others.

Redundancy of system elements adds to the reliability of the system. In some embodiments, each unit (e.g., central data collection servers, master units and remote sensor units can communicate over at least two communication links to at least two other entities. In some embodiments, independent (redundant) encryption key exchanges are used for all messaging between the various units. In some embodiments redundant power supplies are used for the units.

What follows is the description of a universal "black-box" surveillance device capable of use in buildings, bridges, vehicles or containers so as to create a uniform surveillance infrastructure across all vertical applications. Each device would be configured to sample, transmit and process phenomena in exactly the same manner so as to eliminate the notorious problem with data analysis—comparing 'apples' data to 'oranges' data. By standardizing all common processes, this invention overcomes the stovepipe nature of traditional solutions and opens the door to near real-time sharing of early-warning data. Indeed, managers of critical infrastructure are increasingly acknowledging their interdependence and desire to collaborate on the creation of a 360 degree surveillance capability built for interoperability with a goal of prevention.

In the following description, specific details are given to provide a thorough understanding of the disclosed methods and apparatus. However, it will be understood by one of ordinary skill in the art that the disclosed methods and apparatus may be practiced without these specific details. For example, electrical components may be shown in block diagrams in order not to obscure certain aspects in unnecessary detail. In other instances, such components, other structures and techniques may be shown in detail to further explain certain aspects.

It is also noted that certain aspects may be described as a process, which is depicted as a flowchart, a flow diagram, a structure diagram, or a block diagram. Although a flowchart may describe the operations as a sequential process, many of the operations can be performed in parallel or concurrently and the process can be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

FIG. 1A illustrates an example of an infrastructure of a communication system for providing redundant communications between one or more master units and one or more remote sensor units. The example illustrated is a cargo ship with multiple shipping containers 100. The shipping containers 100 may each have one or more master data collection units 105 (each container is depicted with one master unit 105 in this example). The containers contain objects (not shown) that may contain remote sensing units (not shown) attached to the objects. Additionally, remote sensing units 110 may be positioned at other areas in and/or outside the containers. In some cases a device may be connected to a plurality of antennae to overcome positioning problems (e.g., containers stacked on a ship).

Preferably, the remote sensor units 110 and the master units 105 communicate over two or more channels to one or more other communication links to two or more communication devices. As discussed above, the master units 105 communicate with one or more remote sensor units 110. However, the master units 105 can also communicate with various other communication devices and/or networks, either for the purpose of collecting data or relaying data to another device with a more robust direct communication channel, serving as a peer-to-peer or adhoc-network. For example, the communication link 1 shows a master unit 105 communicating with another master unit 105. Communication link 2 shows a master unit 105 communicating with a satellite relay 115. The communication link 5 illustrates a master unit 105 communicating with a land or sea based antenna relay 120. The communication links 2*a* and 3 depict a remote sensor unit 110 communicating with two relay satellites 115. Communication link 1 a depicts a remote sensor unit 110 communicating with another remote sensor unite 110 (e.g., a relay station). By having the secondary communication links 1, 1*a*, 2, 2*a*, 3, and 5, the instructions and/or responses to instructions can be forwarded to the intended remote sensor unit 110 or master unit 105. For example, a master unit 105 can communicate with the land or sea based antenna 120 which can then forward the communication to a second master unit 105 via a communication link 5*a*.

Intermediary relay stations may also be used in forwarding messages. For example, the remote sensor 110*a* may communicate a monitoring measurement to the relay satellite 115 on communication link 3, which the forwards the message to an on-ship intermediary satellite receiver via communication link 6*a*. The intermediary on-ship receiver can then forward the message to the master unit 105 (e.g., the master unit that requested a measurement from the remote sensor) via communication link 6. Other types of communication links not shown in FIG. 1 that can be part of the redundant communication infrastructure include cellular telephone networks, LANs (wired or wireless local area networks), WANs, and wired networks (for fixed location units).

Figure 1B:
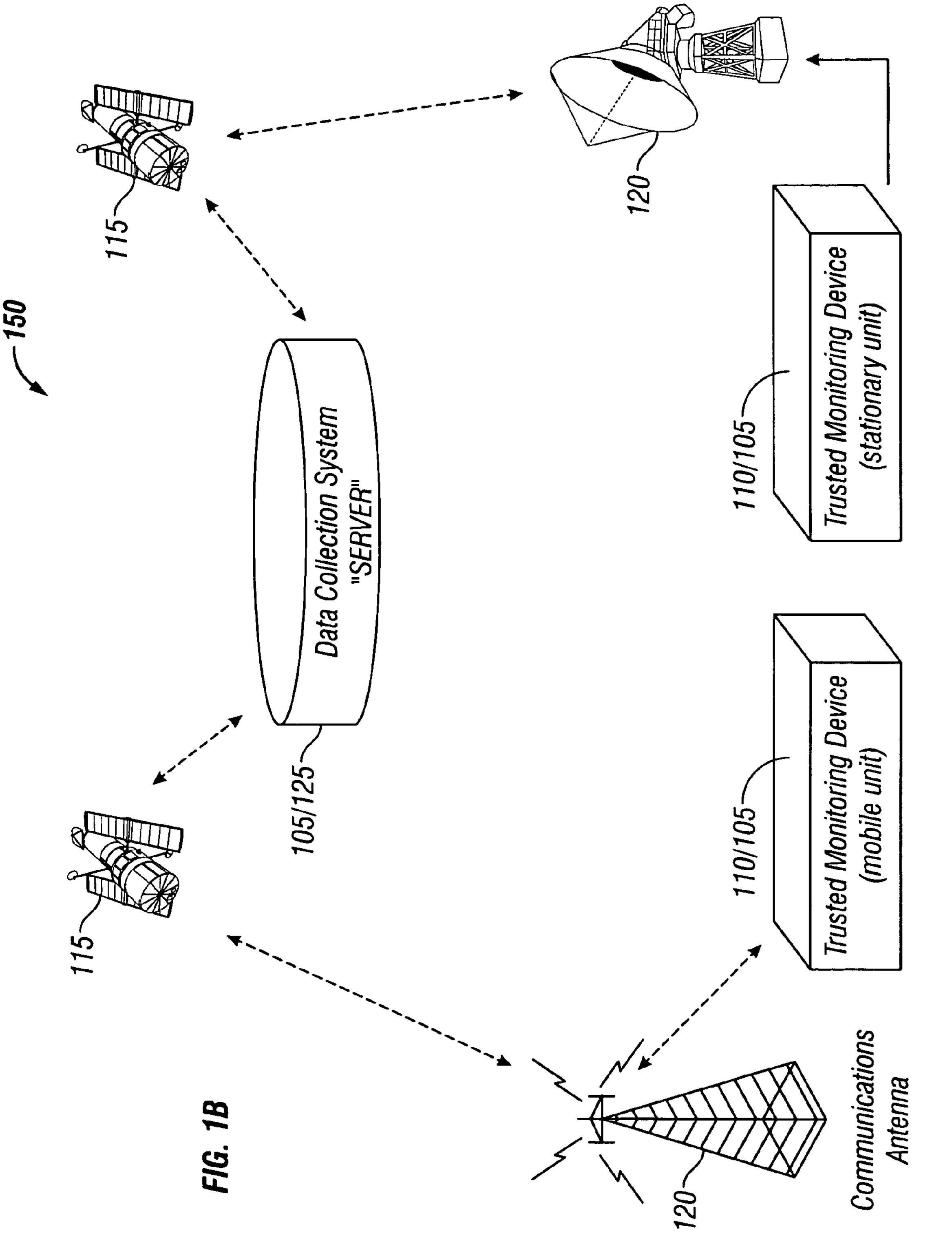
FIG. 1B illustrates another example of a communication system between communication devices.

FIG. 1B illustrates another example of a communication system between communication devices. The communication system can represent communication flow at multiple levels. In one embodiment the master unit 105 serves as a data collection server and communicates with one or more of the remote sensor units 110 that serve as trusted monitoring devices. At another level, the data collection server can be a central data collection server 125 that communicates with one or more master units 105 that serve as the trusted monitoring devices. Communications can be direct between the data collection server (105 or 125) and the trusted monitoring devices (110 or 105). Communications can also be relayed via one or more relay stations such as the relay satellites 115 and the antennas 120.

Redundancy of communication as illustrated by the various communication links of FIG. 1A is only one level of redundancy offered in some embodiments. Further reliability is afforded by other redundancy built into the master units and remote sensor units. FIG. 2 is a functional block diagram of certain components of a master unit, such as the master units 105 discussed above. The master unit system 200 preferably includes a redundant microprocessor component 202. However, a single microprocessor unit 202 could be utilized. The microprocessor 202 may be one or more of any conventional general purpose single- or multi-chip microprocessor such as a Pentium® processor, Pentium II® processor, Pentium III® processor, Pentium IV® processor, Pentium® Pro processor, a 8051 processor, a MIPS® processor, a Power PC® processor, or an ALPHA® processor. In addition, the microprocessor 202 may be one or more of any conventional special purpose microprocessor such as a digital signal processor. The microprocessor 202 is linked to various other modules on the master unit system 200 with conventional address lines, conventional data lines, and/or conventional control lines for purposes of data transfer, instruction reception and transmission and data processing.

Memory is provided by a memory component 204 and/or a data storage unit 206. Preferably, both the memory component 204 and the data storage unit 206 provide redundancy in the form of spatial redundancy (different portions of the same medium), or unit redundancy where two separate devices contain redundant data. Memory refers to electronic circuitry that allows information, typically computer data, to be stored and retrieved. Memory can refer to external devices or systems, for example, disk drives or tape drives. Memory can also refer to fast semiconductor storage (chips), for example, Random Access Memory (RAM) or various forms of Read Only Memory (ROM), that are directly connected to the processor. Other types of memory include bubble memory and core memory. Memory also includes storage devices (internal or external) including flash memory, optical memory and magnetic memory.

The master unit system 200 is comprised of various modules 208-228. As can be appreciated by one of ordinary skill in the art, each of the modules 208-228 comprise various sub-routines, procedures, definitional statements, and macros. Each of the modules 208-228 are typically separately compiled and linked into a single executable program. Therefore, the following description of each of the modules 208-228 is used for convenience to describe the functionality of the master unit system 200. Thus, the processes that are undergone by each of the modules 208-228 may be arbitrarily redistributed to one of the other modules, combined together in a single module, or made available in a shareable dynamic link library. Further each of the modules 208-228 could be implemented in hardware.

A networking circuitry module 208 contains logic and or circuitry for communication of various communication links such as the communication links 1 through 6 and 1*a* through 6*a* discussed above in reference to FIG. 1A. The networking circuitry module 208 may include circuitry for communicating over wireless communication links that may comprise, for example, part of a code division multiple access (CDMA or CDMA2000) communication system, a frequency division multiple access (FDMA) system, an orthogonal frequency division multiple access (OFDM) system such as WiMax (IEEE 802.16x), a time division multiple access (TDMA) system such as GSM/GPRS (General Packet Radio Service)/EDGE (enhanced data GSM environment) or TETRA (Terrestrial Trunked Radio) mobile telephone technology for the service industry, a wideband code division multiple access (WCDMA), a high data rate (1xEV-DO or 1xEV-DO Gold Multicast) system, or in general any wireless communication system employing a combination of techniques. The networking circuitry module 208 may include circuitry for communicating over wired communication links that may comprise, for example, co-axial cable, fiber-optic cable and others.

An alarm module 210 contains circuitry for receiving notification, via pushed messaging or through periodic monitoring of data from various alarm sensors. Alarm sensors may be linked via wired and or wireless communication links. The alarm sensors may monitor audible (audio) signals, visual (video) signals, or on/off type of alerts such as door locks, intruder alerts etc.

An external ports module 212 may provide I/O to various external devices including input/output devices, display devices, printers, cameras, antennas and remote sensors. Preferably, redundant wireless communication links are also provided, via the networking circuitry module 208, for any of the external devices connected via the external ports. Typically, the wired external devices are connected to the computer using a standards-based bus system. In different embodiments of the present invention, the standards based bus system could be Peripheral Component Interconnect (PCI), Microchannel, SCSI, Industrial Standard Architecture (ISA) and Extended ISA (EISA) architectures.

An air circulation component 214 may have multiple input ports for sampling air from various sources. Ducting is connected to the ports to be located in various areas of the monitored area. The air intake system includes a fan, a vacuum or other means of moving air so as to supply one or more sensors with unadulterated samples. Details of the air intake analysis system are discussed below.

A global positioning system (GPS) 216 is used to track the location of the master unit. The GPS module may be connected to an external antenna in situations where the master unit is housed in a shielded container or location. The GPS system can also receive measurements from remote sensor units that contain GPS tracking ability. Thus, multiple objects can be tracked by the same master unit. In addition, multiple sensor units containing GPS capability can combine their satellite signals in order to speed up convergence and capture of the necessary number of GPS satellites. GPS signals may also be combined with other signals to further refine the exact location of the object.

Instructions refer to computer-implemented steps for processing information in the system. Instructions can be implemented in software, firmware or hardware and include any type of programmed step undertaken by components of the system. Instructions received by and transmitted by the master unit 200 are typically encrypted. A digital certificate storage and authentication module 218 is used to establish secure connections with the multiple remote sensor units, relay units, intermediary units and central data collection servers of the global system shown in FIG. 1A. An encryption and decryption module 220 is used to encrypt messages transmitted by and decrypt messages received by the master unit 220. Redundant encryption keys can be used over the redundant channels for added security. The type of encryption for a given task shall be defined by the Assignment Script discussed below in reference to FIG. 8.

An on-board power management module 222 is used to monitor batteries, backup batteries, and/or fuel cells as well as external power source reliability and variability. The state of all power sources is monitored at periodic intervals for both quantity and quality so as to get early warning of future operational limitations.

An external power module 224 is used to convert power from multiple sources for use when available. The power module 224 can sense when the master unit is plugged into various voltage levels, AC and/or DC sources in order to power the unit in multiple areas of the world having different power levels and reliability. Filtering can be used to smooth out power surges in areas where the external power is unreliable. Switching to internal power can be automated when power spikes or power loss is detected. An uninterruptible power supply is preferred. In some embodiments, anomalies in the power supply are logged and reported to the central data collection server.

The remote control of door/orifice enty/exit can be monitored/controlled by module 226. The master unit can control the unlocking and or opening of doors using electro-mechanical, pneumatic devices or other means known to those in the art.

A suite of remote sensor command and control modules 228A to 228K, preferably all redundant, are used to connect peripherals directly to the master unit or to allow the master unit to interact with the remote sensors. The various remote sensor types will be presented below. Additional remote sensor suites can be added to the master unit by recognizing the presence of a new remote sensor. For example, the new remote sensor may be recognized by monitoring for and receiving an identification signal broadcast by the new remote sensor. The identification signal may contain identification information that identifies a type of sensor, a model number etc. The master unit can conduct authentication of the new remote sensor or transmit the identification information to a central server for evaluation and/or approval to communicate with the new sensor. The server can then send a new assignment script that includes new instructions for adding the new remote sensor to the monitoring schedule of the master unit. Additionally, new remote sensor slots can be added by remote programming in order to enhance the number of remote sensors that the master unit can recognize and/or command and interact with. In some embodiments, empty slots in the master device can be filled with new sensors or external, remote child sensors units can communicate with the master. Preferably, any sensor is first authenticated prior to communicating with a second device.

FIG. 3 is a functional block diagram of certain components of a remote sensor unit, such as the remote sensor units 105 discussed above. The remote sensor unit system 300 preferably includes a redundant microprocessor component 302. However, a single microprocessor unit 302 could be utilized. The microprocessor 302 may be one or more of any conventional general purpose single- or multi-chip microprocessor such as a Pentium® processor, Pentium II® processor, Pentium III® processor, Pentium IV® processor, Pentium® Pro processor, a 8051 processor, a MIPS® processor, a Power PC® processor, or an ALPHA® processor. In addition, the microprocessor 302 may be one or more of any conventional special purpose microprocessor such as a digital signal processor. The microprocessor 302 is used as the main computing source of various other modules on the remote sensor unit system 300 with conventional address lines, conventional data lines, and/or conventional control lines for purposes of data transfer, instruction reception and transmission and data processing. In some embodiments, the remote sensor unit acts as a slave device to the master unit, e.g., only doing a subset of the master device functions, e.g., not communicating with the central data collection server directly.

Memory is provided by a memory component 304 and/or a data storage unit 306. Preferably, both the memory component 304 and the data storage unit 306 provide redundancy in the form of spatial redundancy (different portions of the same medium), or unit redundancy where two separate devices contain redundant data. Memory refers to electronic circuitry that allows information, typically computer data, to be stored and retrieved. Memory can refer to external devices or systems, for example, disk drives or tape drives. Memory can also refer to fast semiconductor storage (chips), for example, Random Access Memory (RAM) or various forms of Read Only Memory (ROM), that are directly connected to the processor. Other types of memory include bubble memory and core memory. Memory also includes storage devices (internal or external) including flash memory, optical memory and magnetic memory.

The remote sensor unit system 300 is comprised of various modules 308-324. As can be appreciated by one of ordinary skill in the art, each of the modules 308-324 comprise various sub-routines, procedures, definitional statements, and macros. Each of the modules 308-324 are typically separately compiled and linked into a single executable program. Therefore, the following description of each of the modules 308-324 is used for convenience to describe the functionality of the remote sensor unit system 300. Thus, the processes that are undergone by each of the modules 308-324 may be arbitrarily redistributed to one of the other modules, combined together in a single module, or made available in a shareable dynamic link library. Further each of the modules 308-324 could be implemented in hardware.

A networking circuitry module 308 contains logic and or circuitry for communication of various communication links such as the communication links 1 through 6 and 1*a* through 6*a* discussed above in reference to FIG. 1A. The networking circuitry module 308 may include circuitry for communicating over wireless communication links that may comprise, for example, part of a code division multiple access (CDMA or CDMA2000) communication system, a frequency division multiple access (FDMA) system, an orthogonal frequency division multiple access (OFDM) system such as WiMax (IEEE 802.16x), a time division multiple access (TDMA) system such as GSM/GPRS (General Packet Radio Service)/ EDGE (enhanced data GSM environment) or TETRA (Terrestrial Trunked Radio) mobile telephone technology for the service industry, a wideband code division multiple access (WCDMA), a high data rate (1xEV-DO or 1xEV-DO Gold Multicast) system, or in general any wireless communication system employing a combination of techniques. The networking circuitry module 308 may include circuitry for communicating over wired communication links that may comprise, for example, co-axial cable, fiber-optic cable and others.

An external ports module 312 may provide I/O to various external devices including input/output devices, display devices, printers, cameras, antennas and remote sensors. Preferably, redundant wireless communication links are also provided, via the networking circuitry module 308, for any of the external devices connected via the external ports. Typically, the wired external devices are connected to the computer using a standards-based bus system. In different embodiments of the present invention, the standards based bus system could be Peripheral Component Interconnect (PCI), Microchannel, SCSI, Industrial Standard Architecture (ISA) and Extended ISA (EISA) architectures.

An air circulation component 314 may have multiple input ports for sampling air from various sources. Ducting is connected to the ports to be located at various locations of the monitored area. The air intake system includes a fan, a vacuum or other means of moving air so as to supply one or more sensors with unadulterated samples.

A global positioning system (GPS) 316 is used to track the location of the remote sensor unit. The GPS module may be connected to an external antenna in situations where the master unit is housed in a shielded container or location. The GPS system can also receive measurements from other remote sensor units that contain GPS tracking ability and are in range of the remote sensor unit. Signal levels can be used to estimate ranges to other remote sensor units containing GPS modules 318. In addition, multiple sensor units containing GPS capability can combine their satellite signals in order to accelerate acquisition of the necessary number of GPS satellites.

Instructions received by and transmitted by the remote sensor unit 300 are typically encrypted. A digital certificate storage and authentication module 318 is used to establish secure connections with the multiple remote sensor units, relay units, intermediary units and central data collection servers of the global system shown in FIG. 1A. An encryption and decryption module 320 is used to encrypt messages transmitted by and decrypt messages received by the master unit 220. Redundant encryption keys can be used over the redundant channels for added security.

An on-board power management module 322 is used to monitor batteries, backup batteries, and/or fuel cells as well as external power source reliability and variablility. In some embodiments, anomalies in the power supply are logged and reported to a controlling master unit or forwarded to another communication device as in a peer-to-peer and/or adhoc network.

An external power module 324 is used to convert power from multiple sources for use when available. The power module 324 can sense when the master unit is plugged into various voltage levels, AC and/or DC sources in order to power the unit in multiple areas of the world having different power levels and reliability. Filtering can be used to smooth out power surges in areas where the external power is unreliable. Switching to internal power can be automated when power spikes or power loss is detected. An uninterruptible power supply is preferred.

Figure 4:
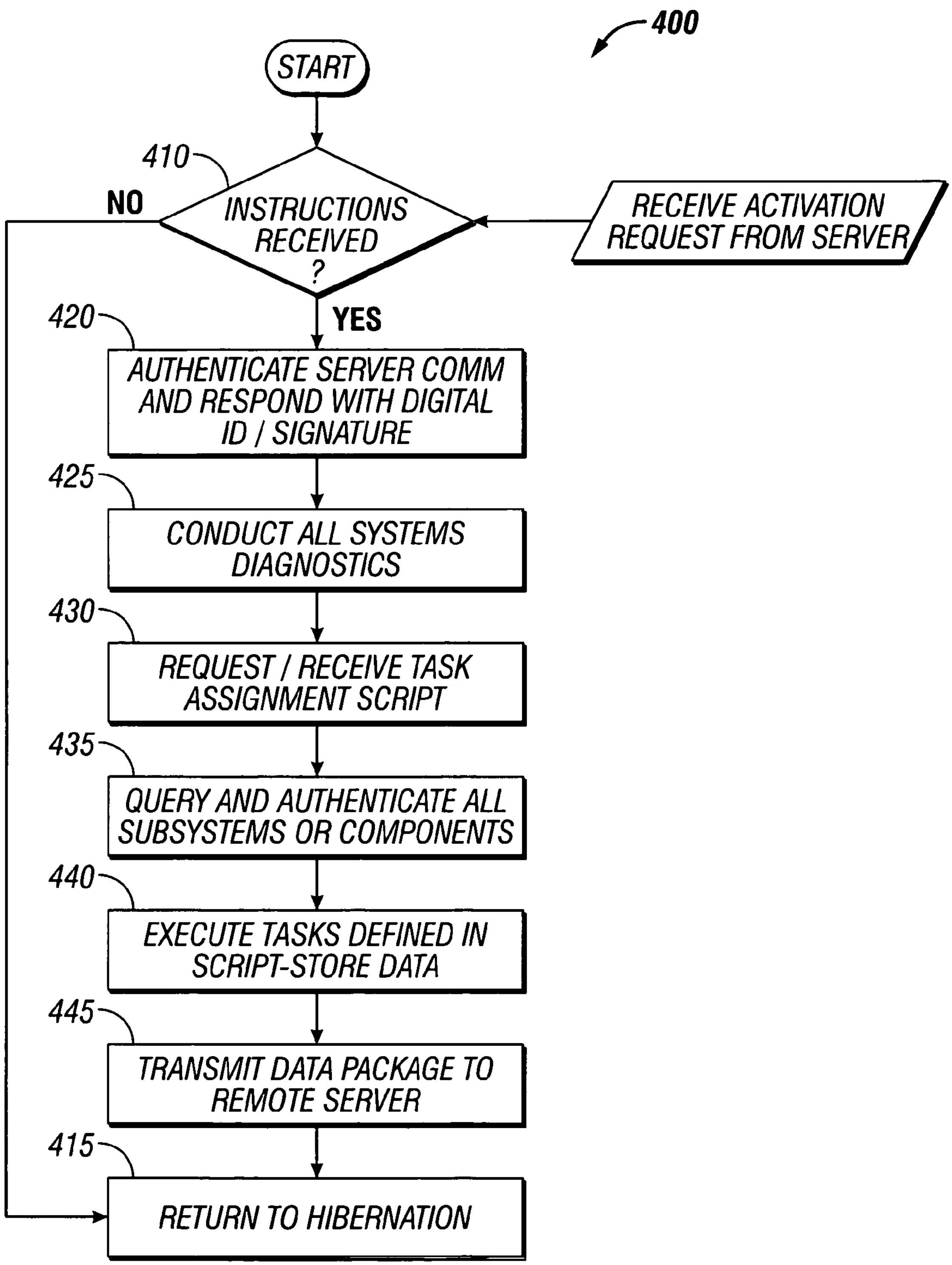
FIG. 4 is a flowchart illustrating certain blocks in a method of processing communications in a master unit.

FIG. 4 is a flowchart illustrating certain blocks in a method of processing communications in a master unit. The process 400 typically starts in a hibernation state. The master unit then transfers out of the hibernation state to step 410 in order to monitor one or more communication links for incoming instructions (e.g., from the central data collection server 125 in FIG. 1B). Monitoring for incoming instructions at step 410 can be continuous, periodic, or random. If no instruction is received at step 410, the process 400 proceeds to step 415 where it returns to the hibernation state. If instructions are received at step 410, the process 400 proceeds to step 420.

Step 420 involves authenticating the server from which the received instructions originated. Authentication can include known techniques such as digital IDs with corresponding digital signatures. If the authentication shows that the received message is authentic, the process 400 continues to step 425. However if the authentication shows the instructions to be false, the process 400 can return to the hibernation state or return to step 410 to detect another incoming instruction. Details of authentication will be discussed below in relation to FIGS. 6 and 7.

If the received instructions are authenticated at step 420, the process can continue at one or more other steps 430 to 445, depending on the received instructions. The instructions are preferably encrypted and the authenticating device decrypts the instructions before performing and/or instructing other devices to perform the tasks. The instruction may direct the master unit to conduct diagnostic tests, step 430, query and authenticate subsystem modules, components and/or remote sensor units, step 435, execute tasks defined in a script, step 440, and/or transmit data packages to one or more remote servers. After completing the instructed tasks the process 400 generally proceeds to step 415 and returns to the hibernation state. Details of the various actions taking place in the steps shown in FIG. 4 will be discussed below in relation to the individual tasks performed by the master unit.

Instructions received by the master unit while performing the process 400 may require the master unit to transmit instructions to one or more of the remote servers. Additionally, the master unit may be programmed to transmit instructions to remote sensors autonomously without receiving command instructions.

Figure 5:
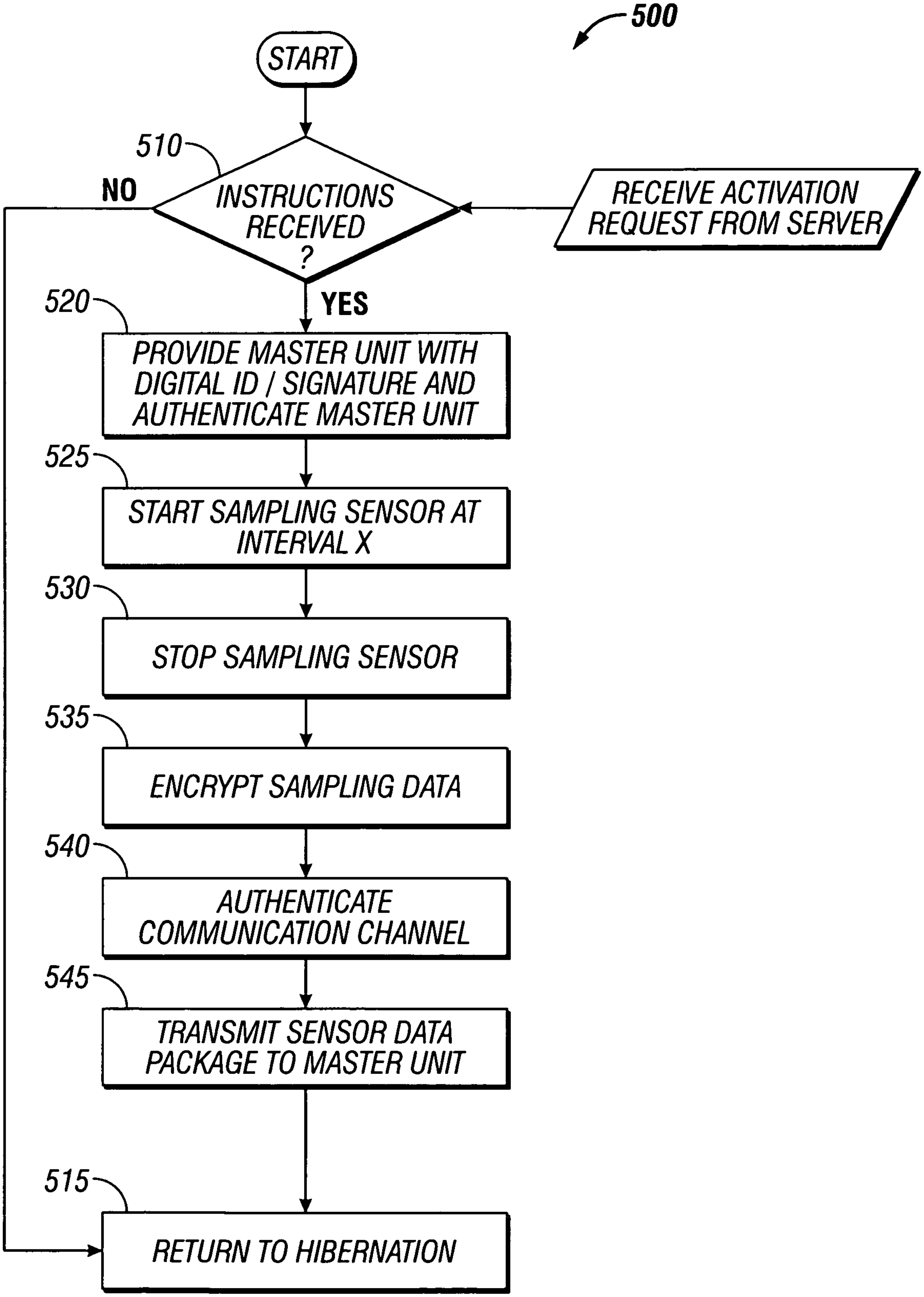
FIG. 5 is a flowchart illustrating certain blocks in a method of processing communications in a remote sensor unit.

FIG. 5 is a flowchart illustrating certain blocks in a method of processing instructions in a remote sensor unit. In this example, the instructions pertain to sampling a sensor measurement and transmitting the sampled data to the master unit. It should be noted, that the sensor unit can also be instructed to perform processing to that shown in FIG. 4 (e.g., diagnostic tests, reprogramming, etc.) The process 500 typically starts in a hibernation state. The master unit then transfers out of the hibernation state to step 510 in order to monitor one or more communication links for incoming instructions (e.g., from the master unit 105 in FIGS. 1A and 1B). Monitoring for incoming instructions at step 510 can be continuous, periodic, or random. If no instruction is received at step 510, the process 500 proceeds to step 515 where it returns to the hibernation state. If instructions are received at step 510, the process 500 proceeds to step 520.

Step 520 involves providing the master unit with the remote sensor unit's digital ID/ signature, thus authenticating the remote sensor to the master unit that sent the instructions. Authentication can include known techniques such as digital IDs with corresponding digital signatures. The master unit can perform the authentication of the remote sensor's response and determine whether or not to use the forthcoming sensor data. Authentication of the master unit to the remote sensor can also be done at step 520. The master unit will provide a digital ID/signature in the instruction message received at step 510 and the remote sensor will authenticate the master unit. This two-way type of authentication protects both the master unit and the remote sensor from being hacked. If the authentication shows that the received message is from an authentic master unit, the process 500 continues to step 525. However if the authentication shows the instructions come from an unauthentic master unit, the process 500 can return to the hibernation state or return to step 510 to detect another incoming instruction. Details of authentication will be discussed below in relation to FIGS. 6 and 7.

If the received instructions are determined to be authentic at step 520, the process can continue at step 525 where the remote sensor unit samples one or more of the measurements that it is equipped to sample. The remote sensor may be instructed to sample for a certain time period or at a certain interval. If the sampling is to be terminated at a certain time, as per predetermined or received instructions, the sampling is stopped at step 530.

If the sampling is not stopped at step 530 (e.g., in a case where a sampling measurement is continued indefinitely or at least for a period of time longer than the time to update the master unit), the remote sensor unit may periodically transfer the sampled data to the master unit. Sampled data that is to be transferred to the master unit is preferably encrypted at step 535. Prior to transmitting the encrypted data, the remote sensor unit may proceed to step 540 to authenticate the master unit on the one or more communication channels that it will transmit the sampled data on.

If the authentication handshake at step 540 (which may be a two-way authentication) is completed successfully, the process 500 continues at step 545 where the sensor data is transmitted to the master unit. In some embodiments, the transmitted data can be digitally compressed. Various compression algorithms can be used to remove the redundancy in the transmitted data, thereby saving time, bandwidth, and/or power. After the sensor data is transmitted at step 545, the process 500 may return to the hibernation state to receive more instructions, or return to sampling the sensor data at step 530. In one embodiment, the remote sensor (or any other transmitting device) is configured to confirm receipt of the data by the master unit (or any other receiving device). If the remote sensor (or any other transmitting device) does not confirm receipt of the data by the master unit (or any other receiving device), the remote sensor can retransmit the data over a different communication path (e.g., one of the available redundant communication links). Redundant communication links may include any of those discussed above. Details of the other actions taking place in the steps shown in FIGS. 4 and 5 at the remote sensor unit will be discussed below in relation to the individual tasks performed by the sensor unit.

Figure 6A:
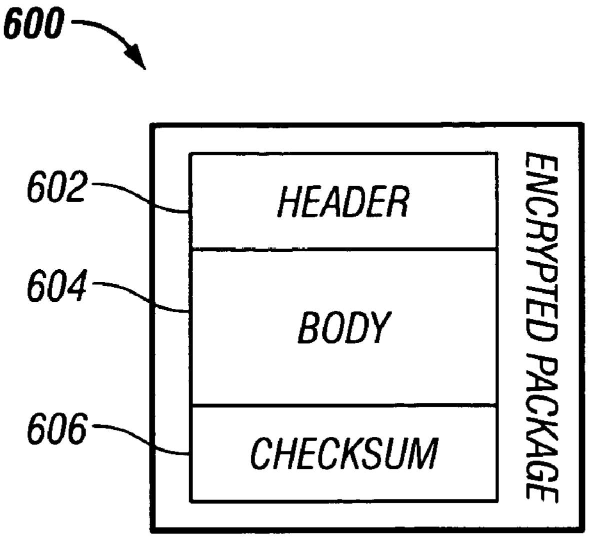
FIG. 6A is a data packet that may be used with the communication systems of FIGS. 1A and 1B.

FIG. 6A is a data packet that may be used in communicating messages to/from the master units, the central data collection servers and/or the remote sensor units. The packet 600 includes a packet header 602, a packet body 604 and a packet checksum 606. The packet 600 is preferably encrypted as discussed above.

The packet header 602 can contain information necessary for identifying such things as the length of the packet, the ID of the recipient of the packet, the data stream ID that the packet is a part of and other information known to those of skill in the art.

The packet body 604 generally contains the message of the packet. The packet body 604 may contain instructions as discussed above, sensor measurement data etc. In some embodiments, the packet body 604 comprises digitally compressed information.

The packet checksum 606 contains encoded information, e.g., a cyclic redundancy check (CRC), which is used to determine the integrity of the packet when the packet is received. The checksum may protect the integrity of data by being used to detect errors in data that are sent through space (e.g., over a communication link) or time (e.g., storage). A checksum may be calculated by simply adding up the components of a message or a portion of a message. A checksum may also be based on the body of the packet containing the message or a portion of the message. Checksums may be an integer number of bits or bytes. A checksum may also be based on a cryptographic hash function. Unlike a simple additive checksum, a hash function may enable detection of a reordering of the bits in a message, inserting or deleting zero-valued bits or bytes and multiple errors that cancel each other out.

Figure 6B:
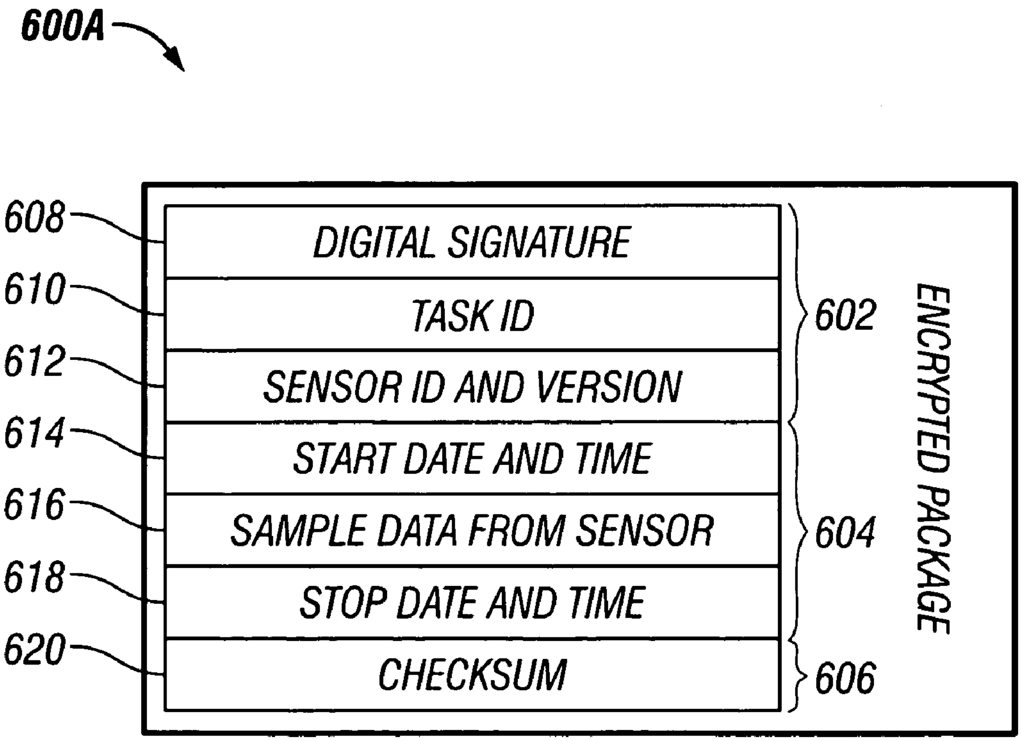
FIG. 6B is a data packet that may be used in communicating messages to/from the master units, the central data collection servers and/or the remote sensor units.

FIG. 6B is a data packet that may be used in communicating sampled sensor data from the sensor unit to the master unit as in step 545 of the process 500. In this example, the packet 600A has a packet header 602 that includes a digital signature field 608, a task ID field 610 and a sensor ID and version field 612. The signature field 608 contains the digital signature that is used to authenticate the remote sensor to the master unit as in step 520 of the process 500.

The Task ID field 610 contains a sequence number that is used by the master unit to identify which task this message contains a response for. The master units may be monitoring many remote sensors, each of which may have several task IDs. The size of the task ID field 610, if a fixed number of bits, should be large enough to cover the largest number of simultaneous tasks that the master unit expects to submit. The task ID field 610 could be variable so as to allow expansion of the number of allowable task IDs to grow as the number of remote sensors which the master unit is control of grows.

The sensor identification field 612 contains information identifying the identity of a particular remote sensor. The sensor identification field 612 may contain indexed information that identifies a number of items such as, for example, the type of sensor (e.g., a temperature sensor, an air sampling sensor, a biometric sensor, etc.), the serial number of the sensor to distinguish from other sensors of the same type, and the version number of the sensor to distinguish software and/or hardware versions.

The packet 600A also contains fields 614 to 618. Field 614 contains the start date and time when the sampled measurements were sampled. The field 616 contains the sampled data that was sampled by the sensor from the start time to the stop time. The field 618 contains the stop date and time for the sampled data.

Field 620 contains the checksum that is used by the master unit in verifying the integrity of the data packet 600A. If the integrity is determined to be erroneous, then the master unit may request that the remote sensor retransmit the message.

Figure 7:
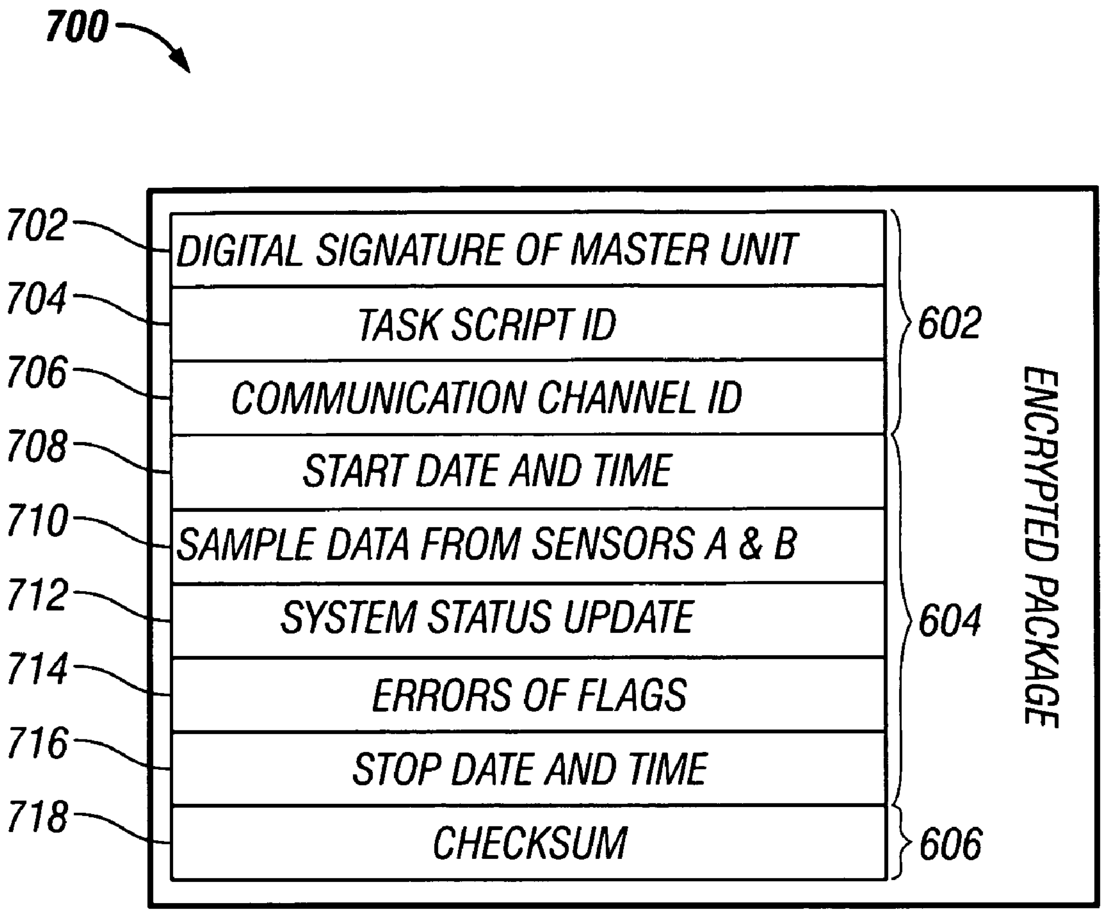
FIG. 7 is an example of a data package for communicating between a master unit and a base station.

FIG. 7 is a data packet that may be used in communicating data from the master unit to the central date collection server as in step 445 of the process 400. In this example, the packet 700 has a packet header 602 that includes a digital signature field 702, a task script ID field 704 and a communication channel ID 706. The signature field 702 contains the digital signature that is used to authenticate the master unit to the central data collection server.

The task script ID field 704 contains a sequence number that is used by the central data collection server to identify which task script this message contains a response for. Task scripts will be discussed below in relation to FIG. 8. As with the task ID field 610, the size of the task script ID field 704, if a fixed number of bits, should be large enough to cover the largest number of simultaneous task scripts that may be active simultaneously.

The Communication channel ID field 706 is used for audit trail tracking purposes. By combining the communication channel ID field 706 with the master unit ID (contained in the master unit digital signature field 702. Maintaining these audit trails may allow identification of compromised or unreliable devices and/or compromised communication channels. Maintaining audit trails may also allow identification of which information was sent by which device and when it was sent.

The packet body 604 of the packet 700 contains the fields 708 to 716 which contain the responses to the various script tasks that the central data collection unit requested of the master unit. The field 708 contains the start date and time for which the message contains monitoring information. The field 710 contains the data sampled from various sensors (two sensors A and B in this example). The field 712 contains system status information. This system status information may be the result of diagnostic test done on the master unit modules and/or components, or they may be the status of remote sensors that the master unit is the controlling parent of. Field 714 contains information regarding errors or flags identifying the errors. Such errors may include errors in previously received task script instruction messages. Field 716 contains the stop date and time for the data contained in the packet 700.

Field 718 contains the checksum that is used by the master unit in verifying the integrity of the data packet 700. If the integrity is determined to be erroneous, then the central data collection unit may request that the remote sensor retransmit the message.

FIG. 8 is a master unit task assignment script for communicating task assignments to a master unit. The header contains 10 fields containing information identifying the master unit that the script is targeted for. The digital signature field is used for authentication of the central data collection server (or other issuing device) that issued the script instructions. Other fields in the header may include a various task classifications including a customer ID, a project ID, and the targeted master unit ID. Other fields in the header may identify the location of the master unit including a vessel or structure ID and/or a location ID. Other header fields may include scheduling or sequence number information such as a logistics number field, a service start and/or stop time field, a field designating a previous script to be replaced by the current script and a script version number.

The body of the task assignment script assigns the tasks to the master unit in the form of an inventory list of all actions and devices approved to participate (or be utilized) in the current job. The body fields 1 through 14 list monitoring tasks to be performed utilizing preferably two remote sensors, designated sensor A and sensor B in this script. The sensors A and B may be pre-designated in a previous script or listed in the current script (not shown in FIG. 8). The master unit will record the various measurements of the service description tasks listed in the body of the task assignment script and log in the other portions of the inventory check list including a comparison check of sensor A to sensor B (e.g., for identification of a faulty sensor), a sample interval time, a transmit interval time, a date an time stamp that the measured data was transmitted back to a central data collection sever, a field identifying whether the data was logged locally, as well as records indicating whether or not the encryption key handshake and authentication tasks were completed successfully. By preferably using authentication and encryption at the data collection server, the master unit and the remote sensors, a secure system for remotely gathering information is formed.

In some embodiments, the master unit (or a data collection server) monitors data received from one or more trusted sensors for the purposes of determining an alarm condition. As discussed above in reference to the Alarm component 210 of FIG. 2, the master unit may receive an indication of a state of alarm from a remote sensor or a sensor connected directly to the master unit via one or more of the sensor suite ports 228A to 228K. However, the master unit may also make a determination of an alarm condition based on data received from remote sensors. In one embodiment, the data received from the remote trusted sensors is compared against a range of acceptable values. The master unit performs a self-diagnosis of the data received from the one or more trusted sensors in order to prevent false alarms. One method of performing the self-diagnosis involves receiving similar data from redundant remote trusted sensors. In one example, a majority rule is used where an alarm is issued if a majority of the similar sensors are transmitting data that is outside of the acceptable levels. If there are 2 redundant remote sensors, then the majority rule may require that both sensors measure unacceptable levels. If there are three redundant sensors, then receiving unacceptable levels from two out of the three will result in a determination of a state of alarm. In another embodiment, the self diagnosis is based on a state of reliability of the trusted monitor that the data is received from. If a remote sensor has previously been determined to be unreliable (e.g., using known methods of determining the integrity of the received data), then the master unit may require additional data (e.g., from other sensors or a retransmission of data from the same sensor) to make the self-diagnosis. Other self-diagnosis techniques that can indicate a corrupt or unreliable source of information include various forms of error checking such as cyclic redundancy checks and/or checksums. Another variation of diagnosis comprises running through a standardized set of routines or measuring something of a known value. The measured result is compared to known values in order to detect errors or to calibrate the device. It should be noted that the central data collection unit can perform similar alarm state determinations as those presented here, involving determining an alarm state of one or more master units and/or remote sensors. In some embodiments the alarm condition can have more than two states (other than an alarm state and a non-alarm state). For example, the alarm state may have several different levels of risk, such as for example, 3, 4, 5, 6, or more levels of risk with the severity of the risk condition increasing with each increase in alarm level. For example, if there are 4 alarm levels, alarm level 1 may be a condition where no received data lies outside the acceptable ranges (e.g., a no alarm state), level 2 may be if the received data from one or more sensors is approaching an unacceptable level, level 3 may be where the received data has exceeded the acceptable level but only by a small amount and the level 4 condition may cover when the received data exceeds the unacceptable level by more than the level 3 amount.

In some embodiments, a monitoring device (e.g., a master unit or a central data collection unit) can monitor certain information from a remote sensor and/or a master unit in an attempt to identify unauthorized tampering of a trusted device in the closed monitoring network. One example of a method of determining tampering of a device involves receiving information from a motion sensor. If a trusted device is a stationary (or mostly stationary) device, the a motion sensor can be monitored in order to determine possible tampering.

For a stationary device, any motion above the noise level of the motion sensor may be used as an indication that someone or something has attempted to move or at least make contact with the stationary device. For other devices, a movement outside of a defined localized or proximal area may be an indication of tampering.

Besides motion sensors, other monitored information may be received and used to perform a self-diagnosis so as to determine improper tampering of the device from which monitored information is received. For example, various methods of detecting jamming signals, or detecting high levels of corruptly received data packets can be an indication of tampering. Such indications of tampering can be used to flag normally trusted devices of the network as untrustworthy. Checksums or CRCs are typically used to identify whether data has been modified between where it originated (e.g., at a trusted remote sensor) and where it was received (e.g., at a master unit and our a data collection server). Jamming signals may be detected by the resulting corrupt data (e.g., failures of CRCs or checksums). Jamming signals may also be detected directly by measuring the level of RF energy within a certain bandwidth of frequencies. High levels of RF energy within a certain bandwidth may be used as an indication that the certain bandwidth is being selectively jammed. Monitoring a plurality of sensors may add confidence to the positive (or negative) detection of jamming.

As discussed above, redundancy of information sources, processors, power supplies, communication links, memory, and communication devices of all kinds may add security and robustness to the information monitored in the monitoring system. Redundant processors may be monitored and if one is determined to be corrupted, the second one may serve as a temporary backup until the corrupt processor is fixed and/or replaced. Redundant sensors may be used to reduce the risk of false alarm by using a majority rules method of determining and issuing an alarm state as discussed above. Redundant power supplies may be utilized to lower the likelihood of power failure.

Redundant communication links offer many useful tools for increasing the security and thus the trustworthiness of the monitoring system of some embodiments. When more than two choices exist as candidates for the redundant communication links, the best choice can be determined in several ways. In one method, battery strength may be used in choosing which redundant communication links to use. If the on-board power management component 222 or 322 determines that the battery level of a master unit or remote sensor is low, the communication link requiring the lower transmit power may be the better choice. If battery life is not a problem, or an external power source with indefinite power availability is present, then the most power demanding communication link may be the best choice since it may prove more reliable and more secure. If a battery level is detected to be low, the power management component may activate a recharge state. Recharging can include use of an external AC or DC power supply, solar power generation, wind power generation or any of other power generating techniques known to those of skill in the art.

In another method, received signal strength may be used as a deciding factor in which communication link to used between two communication devices. The signal to noise ratio (SNR) of received data may be used as an indicator of a reliable channel. One artifact of jamming may be a low SNR measurement of received data. SNR may be used to detect jamming on a communication link. By monitoring the SNR of all available communication links, the communication link with the highest SNR may be chosen as a best link between two communication devices.

In another method, the urgency of the message and/or the security level of the information level being sent may be crucial in deciding which communication link to use. In a situation where the urgency in a message is important, then the estimated time to transmit and receive the message may be most important. If time is more critical then security, then a communication link that utilizes an encryption and/or authentication scheme that requires several handshakes may be less desirable than a communication link that has a simple fast way of establishing a link. Some types of information may call for higher levels of encryption and the communication links with the best encryption security may be chosen first.

In another method of choosing which of a plurality of communication links to use, some links may be disqualified from consideration of various reasons. Repeated failure of data integrity checks may rule out one or more communication links. Integrity check failures may be an indication of equipment failure (e.g., an obstructed antenna), jamming, power failure or other system failures. Redundant antennas may be employed to overcome equipment failure such as an obstructed antenna. Feedback of integrity check results may be used as an indication than one antenna is not as effective as another and the ineffective antenna may not be used until the effectiveness returns.

Redundant communication links need not be utilized simultaneously, although this is one option. Robust communications between two or more devices can be accomplished using a single communication link. Robust communications can be more likely if all data packets are encrypted and authenticated (e.g., signed with a digital signature). The likelihood of losing data can be reduced if large internal memory storage is provided for all communication devices. Redundant memory also reduces likelihood of loss of information due to storage device failure. Frequent handshakes between devices, for example frequent data receipt acknowledgements (Acks) can be used to verify receipt of data. Other methods of providing robust communication links will be apparent to those of skill in the art.

In a situation where a single active channel is being used to communicate between any two devices in the system, there is a chance that communications may be interrupted. In some embodiments that utilize a master/slave hierarchy, the master unit may revert to the beginning of the task being performed when communication was interrupted and restart the task. In some embodiments, both devices may keep a log of actions taken (for example, see the master unit task assignment script shown in FIG. 8) and communication may be reestablished at the last uncompleted task in the list.

Besides reducing the likelihood of a false alarm due to a failure of a single device, multiple remote sensors spread over a geographic area offer capabilities that single sensors do not offer. In some embodiments, redundant sensors can provide an indication of a location of an event or an object. For example, if there is a set of remote sensors for detecting radiation sources, a location of a source of radiation may be pinpointed by interpolating the strengths of the radiation measurements of each sensor. A radius of possible locations may be estimated for a given measurement and estimates from three remote sensors can be used to triangulate a two dimensional position of the source of the radiation. Four remote sensors can be used to located an object in three dimensions. Other examples include temperature sensors used to locate heat sources, and air quality sensors used to locate sources of contaminants. Another example uses multiple GPS receivers to more quickly acquire the number of satellites needed form establishing a GPS location measurement. The geographic diversity offered by spreading GPS receivers over an area decreases the likelihood of all the receivers being blocked (e.g., by buildings etc.). It should be noted that the remote sensors can be located in any of the communication devices discussed above including master units, remote sensors and data collection servers.

Another example of utilizing multiple sensors involves a system for tracking multiple packages or objects in a packaging system. Each of the packages has at least one sensor measuring at least one sensed input condition. The input condition may be a location measurement, an altitude measurement, a temperature, magnetic field measurement or other measurement. Each of the packages also has at least one telemetric communicator configured to provide (e.g., transmit) the sensed input to a coordinating device. The coordinating device is configured to process the sensed information. The telemetric communicator is configured to communicate the sensed information over a first communication link to the coordinating device. In one embodiment, if the first communication link is not available (as can be determined by an integrity check), the telemetric communicator is configured to transmit the sensed information to another telemetric communicator contained in another one of the packages. Thus, if one package is move out of range of the coordinating device, it may still communicate to the coordinating device via an adhoc network of one or more packages. This type of networking can enable the detection of an object being moved (e.g., being stolen from a warehouse) to be identified and monitored for tracking purposes.

Other embodiments provide a system that can track not only the location of one or more objects, but may also verify that the proper individual is in possession of the object. These embodiments include an environmental sensor configured to detect environmental information about an object. The environmental sensor may detect a magnetic field, a radio field or some other field associated with the object. A product identification sensor is configured to receive information to identify the object. The object may contain an RFID tag to transmit to the product identification sensor for identification. There is also a biometric sensor configured to receive biometric information about an individual. In one aspect the biometric information is kept on record in a list of individuals permitted access to the object. The system may also include a GPS sensor configured to receive GPS location information. These sensors are all accessible to be monitored by a trusted electronic device such as, for example, the master control unit or the data collection server discussed above. The monitoring device can perform a diagnosis of the sensed information to assess whether the object being monitored is in danger of being moved and or tampered with by someone other than the permitted individuals.

Figure 9:
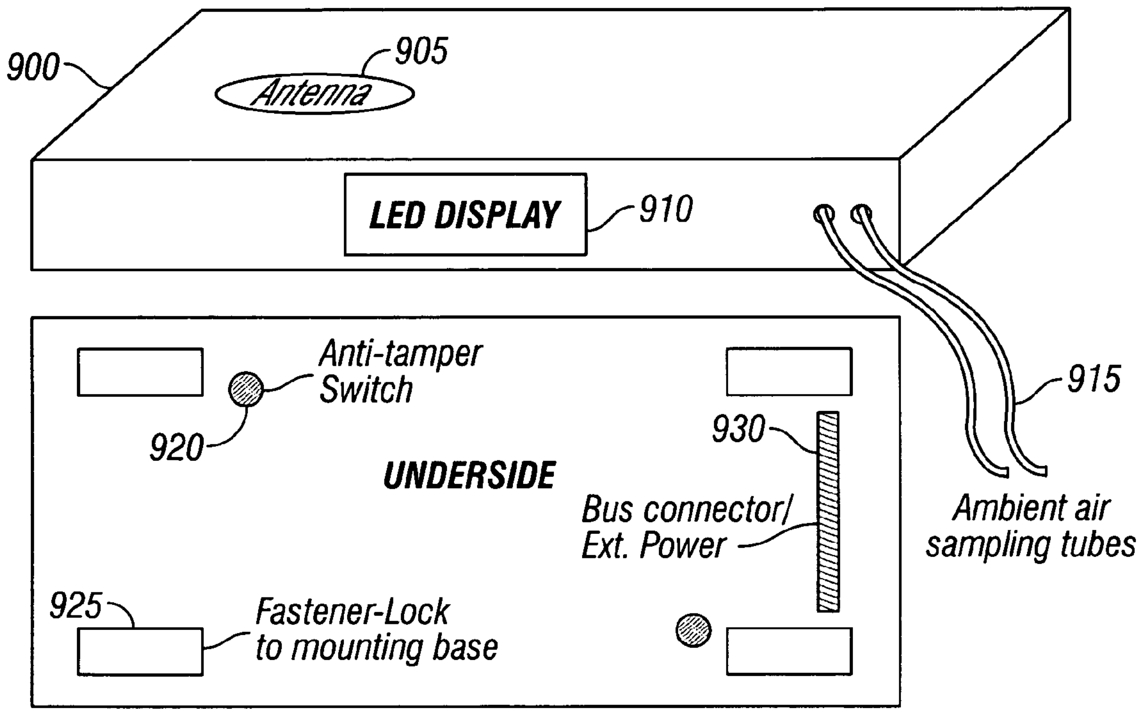
FIG. 9 is an example of a data collection unit housing.

The sensors in the examples discussed above do not need to be attached to the objects that they are tracking in all situations. FIG. 9 shows an example of a housing of a data collection unit. The data collection unit 900 may be a data collection server, a master unit or a remote sensor. The unit 900 in FIG. 9 contains an antenna 905 and an LED display 910. The data collection unit 900 also contains two air sampling tubes 915. The underside of the housing contains at least two pressure or proximity activated anti-tamper switches 920 , a fastener 925 to lock to the mounting base and a bus connector 930 to attach to an optional external power supply, keyboard, display device or similar peripheral. Preferably, the housing of the unit 900 is of Tempest construction and shielded to resist external measurement devices from gaining access to magnetic and or electric emissions.

Figure 10:
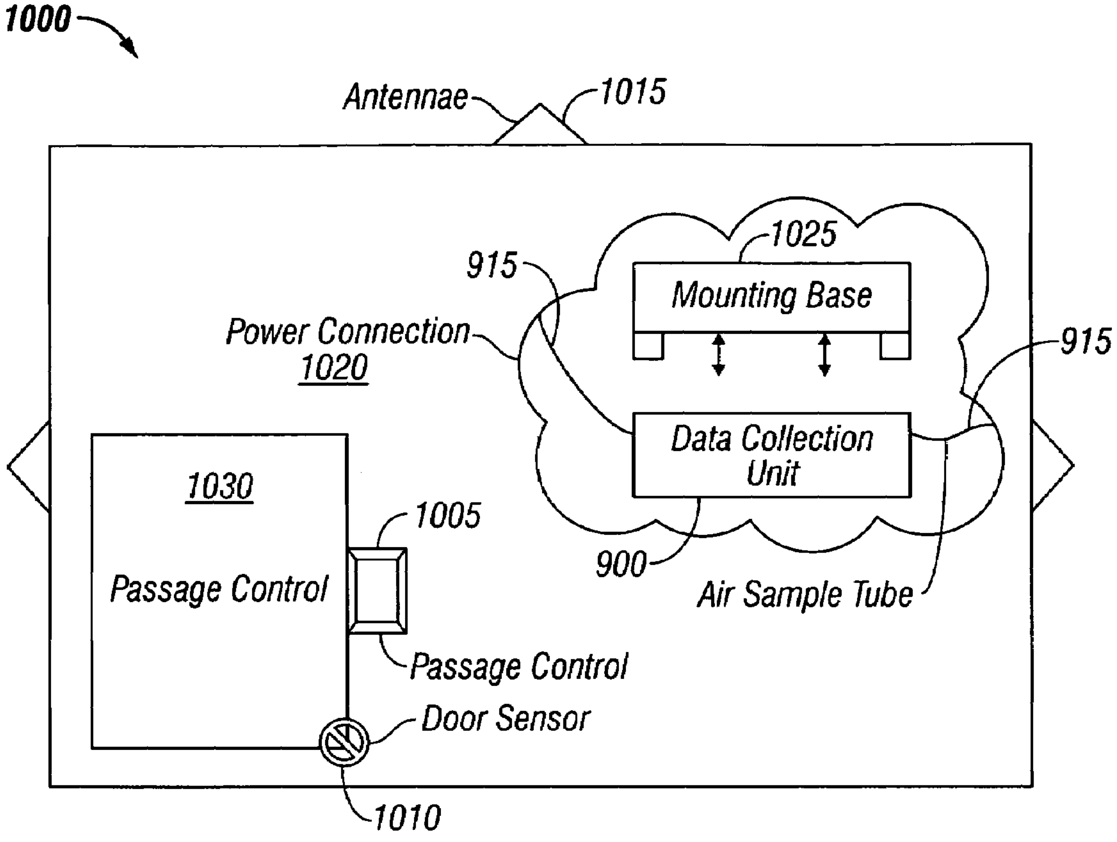
FIG. 10 depicts an example of placement of a data collection unit within a shipping container.

FIG. 10 depicts an example of placement of a data collection unit within a shipping container. The data collection unit 900 is mounted to a mounting base 1025. The mounting base 1025 may include one or more external power connections 1020, and be attached to the container 1000 so as to be difficult to remove. The container 1000 preferably includes multiple antenna 1015 (external and/or internal), where the container in FIG. 10 includes three external antenna. The multiple antenna can provide directional diversity for transmission and reception of signals in case one or more antenna are obstructed. The container 1000 can also comprise multiple internal sensors such as a passage control sensor 1005. The passage control sensor 1005 can permit individuals or objects with proper identification devices (biometrics, smart cards, RFID cards etc.) to enter the container 1000 or an area 1030 within the container. A door sensor 1010 may also indicate whether a door of the area 1030 within the container has been opened. Other sensors, not shown in FIG. 10, may include sensors for detecting the presence of certain objects within the container 1000. Such sensors may include ultrasound pattern sensors, radar or x-ray pattern sensors and others. The data collection unit 900 may use comparison of the ultrasound, x-ray and/or radar patterns to detect changes in the content and/or layout of objects in the container. This can allow for the detection of objects added, moved and/or removed from the container 1000.

Figure 11A:
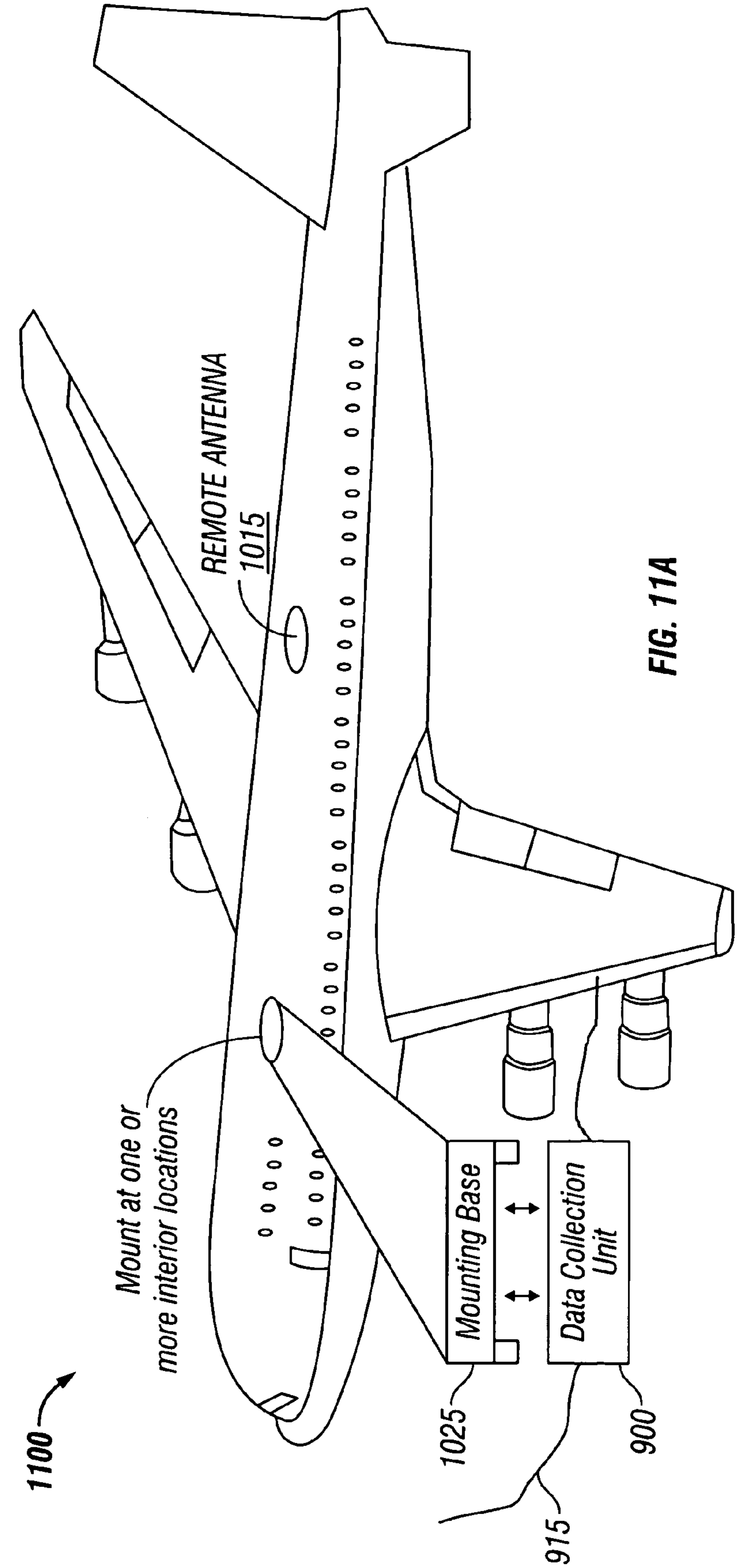
FIG. 11A to 11C show example embodiments of positioning of data collection units for use in the global communication system of FIGS. 1A and 1B.
Figure 11B:
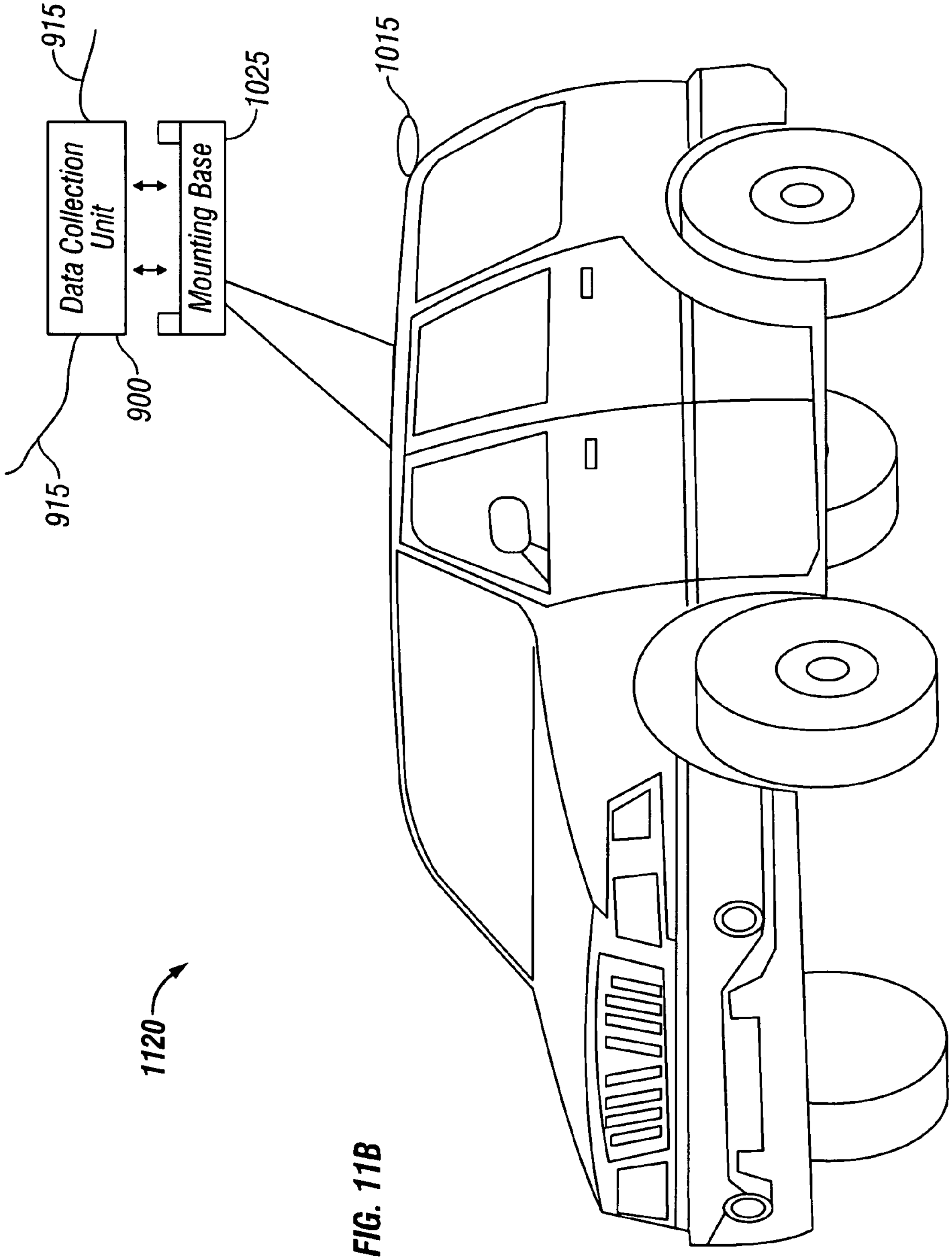
Figure 11C:
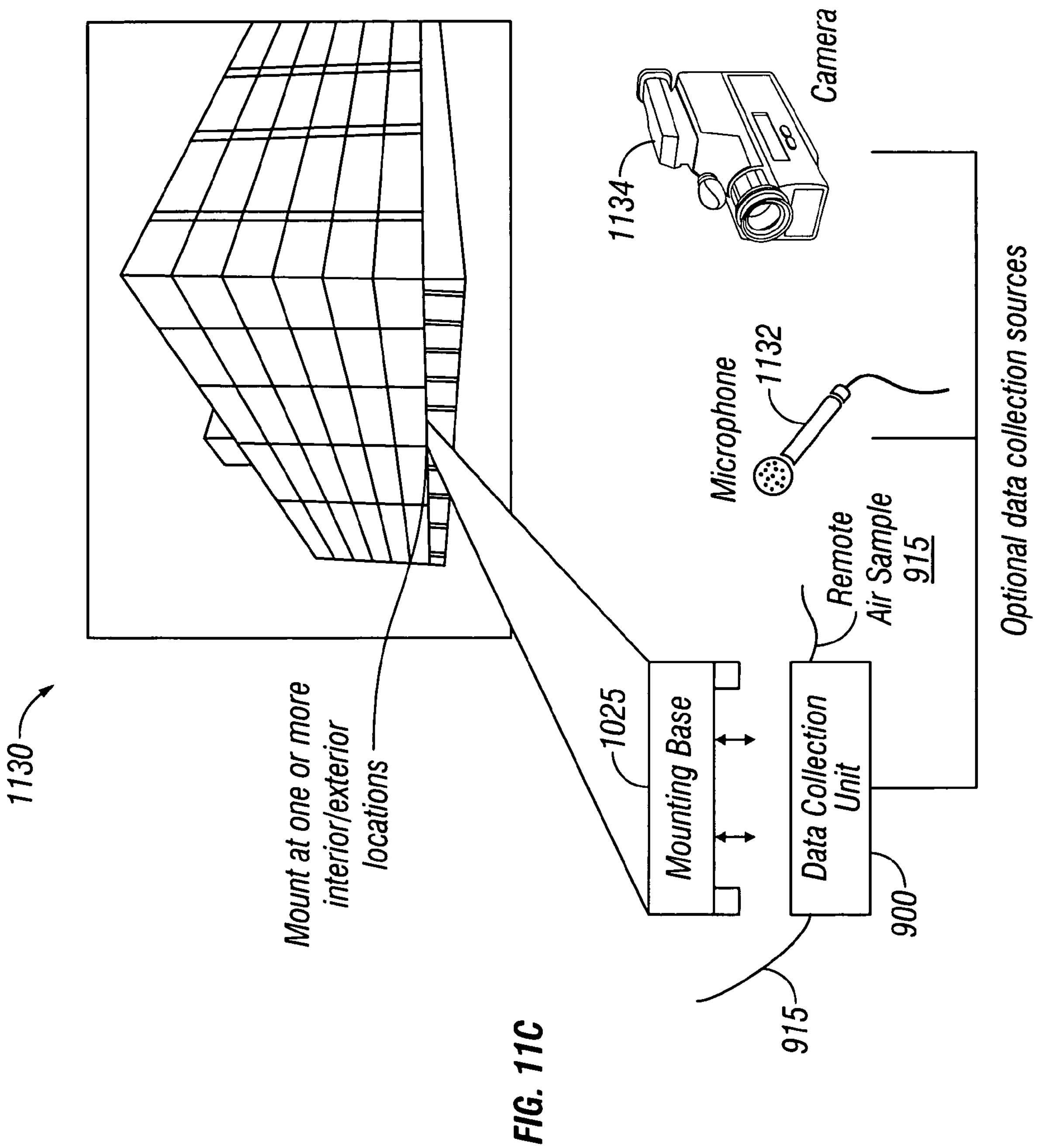

FIGS. 11A to 11C show other example embodiments of places for positioning of data collection units. FIG. 11A shows positioning of the data collection unit 900 within an airliner 1100. FIG. 11B shows positioning of the data collection unit 900 within an automobile 1120. FIG. 11C shows positioning of the data collection unit 900 within a building 1130. The embodiment in FIG. 11C includes an audio capture device 1132 and a video capture device 1134 that can be used to monitor audio and video/image data (e.g., of people entering and/or leaving the building 1130.

An exemplary use of some of the features of the monitoring system discussed above will now be described. This example describes a scenario for monitoring a shipping container. A central server of the monitoring system is provided information such as company information, product description and ID numbers (e.g. manifest), safety disclosures, customs disclosures, financial disclosures and receiver party information about the various items in the container.

The central server may also be provided with biometric data of authorized personnel permitted to access the container. Authorized personnel may have a hand-held-device (HHD) that is configured to communicate with a monitoring system in the container. Upon approaching the container an authorized person can scan the container's identifying information with the HHD at which point an authorization process determines whether to issue an electronic authorization key. The authorization process may include the authorized personnel scanning a biometric fingerprint with the HHD. The HHD can then perform an authentication process based on the biometric scan. If the authentication process is successful, the key can be transmitted to the Master Controller located inside the container.

The Master Controller (MC) receives the key and compares it to the most recent Job Assignment Script (JAS) received from the backend server. If the key codes match, the MC sends a signal to the solenoid to unlock the door of the container and simultaneously starts image capture from both the internal and external cameras. The cameras are remote sensors that the MC is in communication with. The images are stored to the local disk memory of the MC and every 100th frame may be relayed to the central server.

When the authenticated personnel enters the container, he may install the necessary sensors depending on the contents of the container. In this example, the personnel installs radiological sensors, one sensor in each corner of the container and attaches special ducting connected to the MC to pull air from several locations. He first scans each sensor device with the HHD, mounts the sensors securely in place, then transmits the data to the MC with the HHD. The MC compares the sensor codes to the JAS to verify authenticity and instructs each sensor to conduct a self-diagnosis and tamper check.

At this point the MC performs a complete self diagnostic routine of all sensors and systems, then sends the results to the central server. When the diagnostic tests are completed successfully, the server will respond to the MC with approval to reseal the container.

Upon arrival at the loading dock, an authorized personnel scans his personal and corporate ID badges on the scanner mounted on the container door. The codes are passed to the MC and compared with the values in the JAS. If the key codes match, the MC sends a signal to the solenoid to unlock the door of the container and simultaneously starts image capture from both the internal and external cameras.

As other personnel come within range of the container, scanners read each of their personal identity cards and the product codes in or on the boxes. In the meantime, the cameras are operating continuously to record all activity in the container. In this case, the JAS has dictated that all activity be recorded in a real-time log file and that it be relayed to the central server every five minutes. If any unauthorized personnel attempts to enter the container. Motion sensors can detect the presence of a moving body with no readable ID badge. The MC consults the JAS and finds that such breaches are to be handled with both a local audible alarm and a message to the central server.

Once loading is complete, the supervisor closes the container doors, scans his ID cards and enters a code confirming the loading is complete. The message is forwarded to the MC which then sends a signal to activate the solenoid thus locking the door. The MC performs an integrity check of all locks and orifice sensors, takes a baseline sample from all sensors activated as defined by the JAS. The results are relayed to the central server. If all data is in conformance, the server issues an authorization key to the MC which in turn illuminates green LEDs at several locations around the exterior of the container. At this point, the container is ready to be transported to the shipping terminal.

Prior to picking up the container, the trucking company provides the central server with information including the truck ID number, the driver ID number, the relevant container ID and the shipper ID. An electronic authorization key is then transferred to the driver's HHD. Upon arrival at the Wang facility, the driver scans his index finger on his HHD, then scans the truck ID tags, the container ID and the Wang facility ID. The information is relayed to the MC in the container. The MC compares the information and keys to those received in the last JAS, and determines if they are consistent. In this case, the driver was replaced at the last minute and authorization was not received. The LEDs on the container turn red and the HHD instructs the driver to contact his management. His management repeats the registration procedure using his ID, and the central server issues new instructions to his HHD. These changes now allow the driver to successfully mount the container on his truck and remove it from the shipper premises.

When the container's MC detects movement due to the truck moving, it starts the transportation section of the JAS. In this case GPS antenna are scheduled to collect route information and the full range of environmental sensors are sampling every five minutes inside the container.

Both the shipping terminal operator and the ship captain can perform similar procedures as that of the trucking company above such that accountability for the container is never in question.

Once the ship is underway, the JAS for this particular container shipment dictates the following tasks: 1) Sample environmental once every 15 minutes, 2) Capture one image frame from each camera every five minutes, and 3) Transmit all samples to server once per hour.

The first time the MC attempts to communicate with the server, it detects a weak signal from all its own antenna as the container is surrounded by other containers. The JAS dictates a secondary alternative of peer to peer relay with adjacent containers. The MC for this container authenticates itself with a neighbor MC and requests relay which in turn does the same until a container is found with clear access and a strong signal to the satellite or relay antenna.

During the voyage to the destination port, the ship encounters a heavy storm with 30 foot seas. The MC's motion sensors detect pitching in excess of 30 degrees at 20 second intervals. As this value is well outside the norm (the acceptable ranges dictated by the JAS), the MC queries adjacent containers for redundant motion readings and determines that the reading is not in error nor is it significantly different than neighboring containers (an indication that the container is not being stolen). Through the voyage the cameras and audio sensors can record video and audio to detect shifting cargo that may result in product damage.

When the ship arrives in port at Los Angeles, the accountability procedures outlined above can be repeated for each handling situation and entity.

Well before the container arrives, authorized personnel of the receiving company can logon to the central server to track developments along the way.

When the container arrives at the destination dock, personnel can perform biometric authentication as was done in previous situations. The authorization information is relayed to the container's MC where it performs an authorization process to determine whether to issue an electronic key. The MC may consult with the server.

The Master Controller (MC) receives the key and compares it to the most recent Job Assignment Script (JAS) received from the backend server. If the key codes match, the MC sends a signal to the solenoid to unlock the door of the container and simultaneously starts image capture from both the internal and external cameras. The images are stored to the local disk memory and every 100th frame is relayed to the server.

At the destination unloading dock, personnel come within range of the container, scanners read each of their personal identity cards and the product codes in or on the boxes as they are removed from the container. Cameras operate continuously to record all activity in the container. In this case, the JAS has dictated that all activity be recorded in a real-time log file and that it be relayed to the server every fifteen minutes. This example is meant to describe the varied monitoring methods that some embodiments can provide.

Another exemplary use of some of the features of the monitoring system discussed above will now be described. This example describes the use of the technology for monitoring an office building.

The monitoring system in this example is used as a sentry system for the office building. The central server may be provided with information including company identifying information, business description and employee ID numbers, safety disclosures, structural disclosures, financial disclosures and vendor information.

A security personnel downloads authorization information to a handheld device (HHD) then scans his index finger to confirm identity. The HDD instructs him to retrieve a new device from SecureTech's inventory with ID nr 98765. The security personnel scans the box seal then performs a visual integrity inspection and enters his findings to the HHD. He then transmits the information to the sentry system Master Controller (MC) which performs an authorization process with a remote server to determine whether to issue an electronic key. If successful, the key is transmitted to the Master Controller along with its first Job Assignment Script (JAS).

The Master Controller (MC) receives the key and compares it to the most recent Job Assignment Script (JAS) received from the backend server. If the key codes match, the MC sends a signal to the solenoid to unlock the housing of the MC.

The security personnel then proceeds to follow instructions provided by the HDD to perform the following tasks:

1. Open the MC housing
2. Install one modular sensor controller inside the MC to detect proprietary equipment tags.
3. Connect the MC to pre-existing devices in the building:
   a. ID card readers
   b. Proprietary tag reader-sensor heads
   c. Cameras
   d. Door sensors
   e. Elevator activity sensors
   f. Wide-area microphones
   g. Portable x-ray bag scanner
   h. Air-ducting from all entry passages to the MC input portal.

Prior to mounting or connecting the MC, the security personnel scans each device with the HHD, mounts them securely in place, then transmit the data to the MC. The MC compares the sensor codes to the JAS to verify authenticity and instructs each sensor to conduct a self-diagnosis and tamper check.

Once installation of the remote sensors and the Sentry box has been completed, the MC performs a complete diagnostic routine of all sensors and systems, then sends the results to the remote server over both a wired and wireless link (redundant communication links). If all is in order, the server will respond with an activation key and issue a new JAS to the MC.

In one example scenario, exterior cameras detect a middle-aged man just outside the door for prolonged periods of time on three days in the same week. On Tuesday of the following week, the main exterior camera focused on the entrance became occluded (11:22:28). Upon detection, the MC referenced the backup measures specified in the JAS and immediately acted to reposition internal camera 4 in the lobby to point in the direction of the main entrance. Two minutes later (11:24:21), a heavily disguised person entered the lobby with a large suitcase. Since these two events fall outside the normal operating ranges for these two measurements as defined in the most recent JAS, the data is immediately relayed to the central server via both wired and wireless connections.

Such a message is accomplished using the following process steps.

1. The MC conducts a self-diagnosis of all critical components and stores the results;
2. Outbound data is assembled into a list of files and compressed to one package.
   a. Camera frames are synchronized with corresponding date/time
   b. Camera frames are linked to Lat/Long of building as well as position of the anomaly within a pre-defined grid for the space in question.
3. The JAS is consulted for the current encryption parameters and the above package is encrypted accordingly.
4. The message is digitally signed using the remote server's key
5. Identical copies of the package are sent via a wired and cell connection.
6. The MC waits for notice of successful receipt from the remote server.

Several minutes later, the MC detects abnormally high electromagnetic interference. As a result, the ID badge scanner malfunctions and permits an unauthorized person to slip into the main lobby. Already on heightened alert, the MC forwards the event immediately to the server and receives an instant response to shut down elevator operation and lock all exterior doors. All security personnel are alerted to the breach and the intruder is captured. This example is meant only to describe the varied monitoring methods that some embodiments can provide.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A surveillance system comprising:

a plurality of sensors configured to sample environmental and spatial conditions; and an electronic device configured to receive data from the sensors, the electronic device further configured to monitor the received data for anomalies by comparing the received data to a range of acceptable values, and wherein the electronic device includes a motion sensor configured to detect unauthorized contact with the electronic device.

2. The system of claim 1, wherein the electronic device is further configured to transmit an alarm condition in a secure manner to a remote device if unauthorized contact is detected.

3. The system of claim 1, wherein the electronic device is further configured to disable itself if unauthorized contact is detected.

4. A system comprising:

a sensor configured to sample environmental and spatial conditions, the sensor also comprising a motion sensor; and an electronic device configured to receive data from the sensor and to determine integrity of the received data, the electronic device further configured to monitor data received from the motion sensor to detect unauthorized contact with the sensor.

5. The system of claim 4, wherein the electronic device is further configured to transmit an alarm condition in a secure manner to a remote device if unauthorized contact with the sensor is detected.

6. The system of claim 4, wherein the sensor is enclosed in a container.

7. The system of claim 4, further comprising:

at least one redundant sensor configured to sample the sane environmental and spatial conditions as at least one of the plurality of sensors; and wherein the electronic device is further configured to discontinue receiving data from the at least one of the plurality of sensors if unauthorized contact is detected, and to start receiving data from the redundant sensor.

8. The system of claim 4, wherein the electronic device is further configured to disable the sensor if unauthorized contact with the sensor is detected.

9. A surveillance system comprising:

a plurality of sensors configured to sample environmental and spatial conditions; and an electronic device configured to receive data from the sensors, the electronic device further configured to monitor the received data, and wherein the electronic device includes a motion sensor, and wherein the electronic device is further configured to transmit an alarm condition to a remote device if the motion sensor data indicates that the electronic device moves outside of a pre-defined area.

10. The system of claim 9, wherein the electronic device is further configured to transmit the alarm condition in a secure manner to the remote device.

11. The system of claim 9, wherein the electronic device is enclosed in a container.

12. The system of claim 11, wherein the predefined area comprises the container.

13. The system of claim 9, wherein the remote device comprises one of the sensors.

14. The system of claim 9, wherein the electronic device is further configured to disable itself if the motion sensor data indicates that the electronic device moves outside of the predefined area.

15. A monitoring system comprising:

at least one sensing device comprising a plurality of sensors including a motion sensor; and an electronic device configured to receive data from the sensing device, the electronic device further configured to monitor the received data and to determine integrity of the received data, the electronic device further configured to monitor data received from the motion sensor to detect movement of the sensing device, and wherein the electronic device is further configured to transmit an alarm condition to a remote device if the motion sensor data indicates that the sensing device moves outside of a pre-defined area.

16. The system of claim 15, wherein the electronic device is enclosed in a container.

17. The system of claim 16, wherein the predefined area comprises the container.

18. The system of claim 15, wherein electronic device is further configured to start to receive data from a second sensing device if the motion sensor data indicates that the sensing device moves outside of the pre-defined area.

19. The system of claim 15, wherein the electronic device is further configured to disable the sensing device if the motion sensor data indicates that the sensing device moves outside of the pre-defined area.

* * * * *

UNITED STATES PATENT AND TRADEMARK OFFICE

CERTIFICATE OF CORRECTION

PATENT NO. : 7,609,159 B2
APPLICATION NO. : 11/418381
DATED : October 27, 2009
INVENTOR(S) : Greg Benson et al.

It is certified that error appears in the above-identified patent and that said Letters Patent is hereby corrected as shown below:

At Column 23, Line 2, please delete “sane” and insert therefore, --same--.

Signed and Sealed this

Twenty-seventh Day of April, 2010

David J. Kappos

David J. Kappos
*Director of the United States Patent and Trademark Office*

UNITED STATES PATENT AND TRADEMARK OFFICE

CERTIFICATE OF CORRECTION

PATENT NO. : 7,609,159 B2
APPLICATION NO. : 11/418381
DATED : October 27, 2009
INVENTOR(S) : Benson et al.

It is certified that error appears in the above-identified patent and that said Letters Patent is hereby corrected as shown below:

Title page, item (*) Notice: Subject to any disclaimer, the term of this patent is extended or adjusted under 35 U.S.C. 154(b) by 0 days.

Delete "0 days" and insert --147 days--.

Signed and Sealed this

Twenty-seventh Day of July, 2010

David J. Kappos

*Director of the United States Patent and Trademark Office*